(12) United States Patent
Lemar et al.

(10) Patent No.: US 7,844,617 B2
(45) Date of Patent: *Nov. 30, 2010

(54) SYSTEMS AND METHODS OF DIRECTORY ENTRY ENCODINGS

(75) Inventors: Eric M. Lemar, Seattle, WA (US); Nathan N. White, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/794,492

(22) Filed: Jun. 4, 2010

(65) Prior Publication Data

US 2010/0241632 A1    Sep. 23, 2010

Related U.S. Application Data

(63) Continuation of application No. 12/562,000, filed on Sep. 17, 2009, now Pat. No. 7,739,288, which is a continuation of application No. 11/645,216, filed on Dec. 22, 2006, now Pat. No. 7,593,938.

(51) Int. Cl.
*G06F 17/30* (2006.01)
(52) U.S. Cl. .................................. 707/759; 707/822
(58) Field of Classification Search ............... 707/759, 707/822
See application file for complete search history.

(56) References Cited

U.S. PATENT DOCUMENTS

| | | | |
|---|---|---|---|
| 5,163,131 A | 11/1992 | Row et al. | |
| 5,181,162 A | 1/1993 | Smith et al. | |
| 5,212,784 A | 5/1993 | Sparks | |
| 5,230,047 A | 7/1993 | Frey et al. | |
| 5,251,206 A | 10/1993 | Calvignac et al. | |
| 5,258,984 A | 11/1993 | Menon et al. | |
| 5,329,626 A | 7/1994 | Klein et al. | |
| 5,359,594 A | 10/1994 | Gould et al. | |
| 5,403,639 A | 4/1995 | Belsan et al. | |
| 5,548,724 A | 8/1996 | Akizawa et al. | |
| 5,568,629 A | 10/1996 | Gentry et al. | |
| 5,596,709 A | 1/1997 | Bond et al. | |

(Continued)

FOREIGN PATENT DOCUMENTS

EP    0774723    5/1997

(Continued)

OTHER PUBLICATIONS

Nov. 15, 2002 Int'l Search report PCT/US02/24728, 2 pages.

(Continued)

*Primary Examiner*—James Trujillo
*Assistant Examiner*—William Spieler
(74) *Attorney, Agent, or Firm*—Knobbe, Martens, Olson & Bear LLP

(57) ABSTRACT

In general, the invention relates to supporting multiple different character encodings in the same file system. In one embodiment, a method is provided for filename lookup that supports multiple character encodings. The method comprises storing filename data in a first character encoding into an indexed data structure. The method further comprises receiving filename data in a second encoding. The method also comprises looking up filename data in the indexed data structure using the second encoding.

18 Claims, 19 Drawing Sheets

U.S. PATENT DOCUMENTS

| | | | |
|---|---|---|---|
| 5,606,669 A | 2/1997 | Bertin et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,754,756 A | 5/1998 | Watanabe et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,917,998 A | 6/1999 | Cabrera et al. |
| 5,933,834 A | 8/1999 | Aichelen |
| 5,943,690 A | 8/1999 | Dorricott et al. |
| 5,966,707 A | 10/1999 | Van Huben et al. |
| 5,996,089 A | 11/1999 | Mann |
| 6,014,669 A | 1/2000 | Slaughter et al. |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,052,759 A | 4/2000 | Stallmo et al. |
| 6,055,543 A | 4/2000 | Christensen et al. |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,138,126 A | 10/2000 | Hitz et al. |
| 6,154,854 A | 11/2000 | Stallmo |
| 6,173,374 B1 | 1/2001 | Heil et al. |
| 6,209,059 B1 | 3/2001 | Ofer et al. |
| 6,219,693 B1 | 4/2001 | Napolitano et al. |
| 6,321,345 B1 | 11/2001 | Mann |
| 6,334,168 B1 | 12/2001 | Islam et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 | 5/2002 | Latif et al. |
| 6,397,311 B1 | 5/2002 | Capps |
| 6,405,219 B2 | 6/2002 | Saether et al. |
| 6,408,313 B1 | 6/2002 | Campbell et al. |
| 6,421,781 B1 | 7/2002 | Fox et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,499,091 B1 | 12/2002 | Bergsten |
| 6,502,172 B2 | 12/2002 | Chang |
| 6,502,174 B1 | 12/2002 | Beardsley |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,594,744 B1 | 7/2003 | Humlicek et al. |
| 6,598,174 B1 | 7/2003 | Parks et al. |
| 6,618,798 B1 | 9/2003 | Burton et al. |
| 6,662,184 B1 | 12/2003 | Friedberg |
| 6,671,686 B2 | 12/2003 | Pardon et al. |
| 6,671,704 B1 | 12/2003 | Gondi et al. |
| 6,687,805 B1 | 2/2004 | Cochran |
| 6,732,125 B1 | 5/2004 | Autrey et al. |
| 6,748,429 B1 | 6/2004 | Talluri et al. |
| 6,801,949 B1 | 10/2004 | Bruck et al. |
| 6,848,029 B2 | 1/2005 | Coldewey |
| 6,856,591 B1 | 2/2005 | Ma et al. |
| 6,895,534 B2 | 5/2005 | Wong et al. |
| 6,907,011 B1 | 6/2005 | Miller et al. |
| 6,917,942 B1 | 7/2005 | Burns et al. |
| 6,922,696 B1 | 7/2005 | Lincoln et al. |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 6,990,611 B2 | 1/2006 | Busser |
| 7,007,044 B1 | 2/2006 | Rafert et al. |
| 7,007,097 B1 | 2/2006 | Huffman et al. |
| 7,017,003 B2 | 3/2006 | Murotani et al. |
| 7,043,485 B2 | 5/2006 | Manley et al. |
| 7,069,320 B1 | 6/2006 | Chang et al. |
| 7,111,305 B2 | 9/2006 | Solter et al. |
| 7,124,264 B2 | 10/2006 | Yamashita |
| 7,146,524 B2 | 12/2006 | Patel et al. |
| 7,152,182 B2 | 12/2006 | Ji et al. |
| 7,177,295 B1 | 2/2007 | Sholander et al. |
| 7,184,421 B1 | 2/2007 | Liu et al. |
| 7,194,487 B1 | 3/2007 | Kekre et al. |
| 7,225,204 B2 | 5/2007 | Manley et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,313,614 B2 | 12/2007 | Considine et al. |
| 7,318,134 B1 | 1/2008 | Oliveira et al. |
| 7,373,426 B2 | 5/2008 | Jinmei et al. |
| 7,386,697 B1 | 6/2008 | Case et al. |
| 7,440,966 B2 | 10/2008 | Adkins et al. |
| 7,451,341 B2 | 11/2008 | Okaki et al. |
| 7,509,448 B2 | 3/2009 | Fachan et al. |
| 7,533,298 B2 | 5/2009 | Smith et al. |
| 7,546,354 B1 | 6/2009 | Fan et al. |
| 7,546,412 B2 | 6/2009 | Ahmad et al. |
| 7,571,348 B2 | 8/2009 | Deguchi et al. |
| 7,680,836 B2 | 3/2010 | Anderson et al. |
| 7,680,842 B2 | 3/2010 | Anderson et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0035668 A1 | 3/2002 | Nakano et al. |
| 2002/0038436 A1 | 3/2002 | Suzuki |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0124137 A1 | 9/2002 | Ulrich et al. |

| | | |
|---|---|---|
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0131860 A1 | 7/2003 | Ashcraft et al. |
| 2003/0135514 A1 | 7/2003 | Patel et al. |
| 2003/0149750 A1 | 8/2003 | Franzenburg |
| 2003/0158873 A1 | 8/2003 | Sawdon et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182325 A1 | 9/2003 | Manley et al. |
| 2004/0003053 A1 | 1/2004 | Williams |
| 2004/0024731 A1 | 2/2004 | Cabrera et al. |
| 2004/0024963 A1 | 2/2004 | Talagala et al. |
| 2004/0078812 A1 | 4/2004 | Calvert |
| 2004/0133670 A1 | 7/2004 | Kaminsky et al. |
| 2004/0143647 A1 | 7/2004 | Cherkasova |
| 2004/0153479 A1 | 8/2004 | Mikesell et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0260673 A1 | 12/2004 | Hitz et al. |
| 2005/0010592 A1 | 1/2005 | Guthrie |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0131860 A1 | 6/2005 | Livshits |
| 2005/0131990 A1 | 6/2005 | Jewell |
| 2005/0138195 A1 | 6/2005 | Bono |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |
| 2005/0192993 A1 | 9/2005 | Messinger |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047925 A1 | 3/2006 | Perry |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094452 A1 | 4/2007 | Fachan |
| 2007/0168351 A1 | 7/2007 | Fachan |
| 2007/0171919 A1 | 7/2007 | Godman et al. |
| 2007/0195810 A1 | 8/2007 | Fachan |
| 2007/0233684 A1 | 10/2007 | Verma et al. |
| 2007/0233710 A1 | 10/2007 | Passey et al. |
| 2007/0255765 A1 | 11/2007 | Robinson |
| 2008/0005145 A1 | 1/2008 | Worrall |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0126365 A1 | 5/2008 | Fachan et al. |
| 2008/0154978 A1 | 6/2008 | Lemar et al. |
| 2008/0168458 A1 | 7/2008 | Fachan et al. |
| 2008/0256103 A1 | 10/2008 | Fachan et al. |
| 2008/0256545 A1 | 10/2008 | Fachan et al. |
| 2008/0294611 A1 | 11/2008 | Anglin et al. |

FOREIGN PATENT DOCUMENTS

| | | |
|---|---|---|
| JP | 2006-506741 | 6/2004 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

Apr. 20, 2004 Int'l Search report PCT/US03/36699, 10 pages.
Philip A. Bernstein, Vassos Hadzilacos, and Nathan Goodman, Concurrency Control and Recovery in Database Systems, Addison-Wesley, 370 pages, 1987.
Kenneth P. Birman, Building Secure and Reliable Network Applications, Manning, 1996, pp. 1-327.
Kenneth P. Birman, Building Secure and Reliable Network Applications, Manning, 1996, pp. 328-619.
Birk, Y., Deterministic load-balancing schemes for disk-based video-on-demand storage servers, Mass Storage Systems 1995; Storage—At the Forefront of Information Infrastructures', Proceedings of the Fourteenth IEEE Symposium on Monterey, CA, Sep. 11-14, 1995, pp. 17-25.
Coulouris et al., Distributed Systems Concepts and Design; Addison-Wesley, Second Edition, 1994, pp. 353-371 and 377-405.
Jim Gray and Andreas Reuter, Transaction Processing: Concepts and Techniques, Morgan Kaufmann, 1993, pp. 1-328.
Jim Gray and Andreas Reuter, Transaction Processing: Concepts and Techniques, Morgan Kaufmann, 1993, pp. 329-664.

Jim Gray and Andreas Reuter, Transaction Processing: Concepts and Techniques, Morgan Kaufmann, 1993, pp. 665-1105.

Kumar, Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-81862025-6 p. 446, left-hand column, line 1—p. 447, last line.

Nancy A. Lynch, Distributed Algorithms, Morgan Kaufmann, 1996, pp. 1-409.

Nancy A. Lynch, Distributed Algorithms, Morgan Kaufmann, 1996 pp. 410-871.

Sape Mullender, editor, Distributed Systems (2nd Ed.), ACM Press/ Addison-Wesley Publishing Co., New York, NY, USA, 1993, pp. 1-327.

Sape Mullender, editor, Distributed Systems (2nd Ed.), Acm Press/ Addison-Wesley Publishing Co., New York, NY, USA, 1993, pp. 328-604.

Gibson, Garth A. et al., *The Scotch Parallel Storage System*, IEEE, 1995, pp. 403-410.

Gerhard Weikum, et al., Transactional Information Systems: Theory, Algorithms, and the Practice of Concurrency Control and Recovery, Morgan Kaufmann, 2002, pp. 1-450.

Gerhard Weikum, et al., Transactional Information Systems: Theory, Algorithms, and the Practice of Concurrency Control and Recovery, Morgan Kaufmann, 2002, pp. 451-863.

Sanjay Ghemawat et al., The Google File System, Symposium on Operating Systems Principles, Oct. 19-22, 2003, 15 pages, Bolton Landing, NY.

Pei Cao et al., The TickerTAIP parallel RAID architecture, 1993, 12 pages, Princeton, NJ.

Pei Cao et al., The TickerTAIP parallel RAID architecture, ACM Transactions on Computer Systems, vol. 12, No. 3, Aug. 1994, 34 pages, Palto Alto, California.

Duzett, Bob et al., *An Overview of the nCube 3 Supercomputer*, IEEE, Jul. 1992, pp. 458-464.

Hartman, John Henry, *The Zebra Striped Network File System*, (Sc.B. (Brown University) 1987, pp. 1-148.

Long, Darrell D.E., et al., *Swift/RAID: A Distributed RAID System*, Computing Systems, vol. 7, No. 3 Summer 1994, pp. 333-359.

Stallings, William, Operating Systems, Prentice Hall, Fourth Edition; 2001, pp. 197-253 and 265-293.

Michael Stonebraker et al., Distributed Raid: A New Multiple Copy Algorithm, Proc. Sixth Int. Conf. Data Eng., IEEE Service Center, Piscataway, NJ (IEEE cat no. 90CH2840-7), pp. 430-437, Feb. 5, 1990.

United States Court of Appeals, Federal Circuit, Seachange International, Inc. Vs. nCUBE, Corp., Oct. 26, 2004, 28 pages.

United States Court of Appeals, Federal Circuit, Seachange International, Inc. Vs. C-Corp, Inc., Jun. 29, 2005, 22 pages.

United States District Court, Delaware, Seachange International, Inc. Vs. nCUBE, Corp., Apr. 7, 2004, 13 pages.

United States District Court, Delaware, Seachange International, Inc. Vs. nCUBE, Corp., Aug. 29, 2000, 12 pages.

Steven M. Bauer, Letter to Steve Goldman, Jul. 31, 2006 (including the first page of the patents), 8 pages.

Arthur S. Rose, Letter to Steven M. Bauer, Jul. 8, 2006, 2 pages.

Steven M. Bauer, Letter to Arthur S. Rose, Sep. 25, 2006, 2 pages.

Steven M. Bauer, Letter to Arthur S. Rose, Oct. 31, 2006, 1 page.

Arthur S. Rose, Letter to Steven M. Bauer, Nov. 9, 2006, 2 pages.

Steven M. Bauer, Letter to Arthur S. Rose, Feb. 6, 2007, 2 pages.

Arthur S. Rose, Letter to Steven M. Bauer, Feb. 23, 2007, 1 page.

Steven M. Bauer, Letter to Arthur S. Rose, Jun. 7, 2006 (including claim chart), 28 pages.

Arthur S. Rose, Letter to Steven M. Bauer, Jun. 22, 2007, 1 page.

Todd A. Gerety, Letter to Arthur S. Rose, Jun. 26, 2006 (exhibits listed separately below), 1 page.

Isilon Systems, "Isilon IQ Plateform Overview", 4 pages, 2007 (Exhibit A).

Isilon Systems, "Uncompromising Reliability through Clustered Storage", Sep. 2006, 10 pages. (Exhibit B).

Byteandswitch, "Discovery Chooses Isilon," Apr. 23, 2007, 1 page (Exhibit C).

Taneja Group Technology Analysts, "The Power of InfiniBand and Clustered Storage", Dec. 2005, 8 pages (Exhibit E).

Arthur S. Rose, Letter to Steven M. Bauer, Aug. 31, 2007, 4 pages.

Ramez Elmasri, Fundamentals of Database Systems 3rd ed, Sep. 30, 1999, Addison-Wesley, pp. 155, 169, 171, 172, 173, 178, 181, 182, 381, 771.

MCSA/MSCE/MCDBA Self Paced Training Kit: MS SQL Server 2000 System Administration, May 14, 2003, Microsoft Press, Second Edition, 12 pages.

Supp EPO Search Report, App. No. EP 03 78 3599; dated Apr. 29, 2008, 2 pages.

Levy E., Ed.—Institute of Electrical and Electronics Engineers: "Incremental restart (database management)" Proc. Int. Conf. Data Eng., Kobe, JP, Apr. 8-12, 1991; IEEE COMP. SOC. Press, U.S., vol. Conf. 7, Apr. 8, 1991, pp. 640-648.

Haerder T et al: "Principles of Transaction-Oriented Database Recovery" ACM Computing Surveys, ACM, New York, NY, US, vol. 15, No. 4, Dec. 1, 1983, pp. 287-317.

Aug. 06, 2004 Int'l Search report PCT/US03/33704, 11 pages.

May 21, 2007 European Search Report EP 02756944.1-2201, 8 pages.

Feb. 22, 2008 Int'l Search report PCT/US07/018326, 20 pages.

May 8, 2008 Int'l Search report PCT/US07/018324, 13 pages.

Gray J et al: "Transaction processing: concepts and techniques (excerpt), Passage" Transaction Processing: Concepts and Techniques, Jan. 1, 1993, pp. 373-445.

Garcia-Molina H et al: "Database System Implementation, passage" Database System Implementation, Jan. 1, 2000, pp. I-V, 423-509.

Wedde H. F., et al.: "A universal framework for managing metadata in the distributed Dragon Slayer System", Proceedings of the Euromicro Conference. Euromicro. Informatics: Inventing the Future, Proceedings of Euromicro Workshop On Multimedia and Telecommunications, vol. 2, Sep. 5, 2000, pp. 96-101.

Tanenbaum, Andrew S., Minix Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.

Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.

May 18, 2009 Int'l Search report PCT/US08/059798, 18 pages.

Lougher P. et al., "Scalable storage servers for digital audio and video," International Conference on Storage and Recording Systems, 1994, Keele, UK, Jan. 1, 1994, pp. 140-143.

Oct. 8, 2008 European Supplemental Search Report EP 02 75 6944, 6 pages.

Jan. 23, 2009 Examination Report EP 02 75 6944, 5 pages.

Oct. 22, 2009 Int'l Preliminary Report on Patentability PCT/US08/059798, 10 pages.

Keidar, et al.: Increasing the Resilience of Distributed and Replicated Database Systems (1998) pp. 1-25.

Reddy, P. Krishna et al., Reducing the blocking in two phase commit with backup sites Apr. 15, 2003, Elsevier, pp. 39-47.

IOS Commands, Feb. 6, 2005, Pantz.org, [online], <web.archive.org/web/20050206184604/http://pantz.org/os/ios/ioscommands.shtml>, pp. 1-12 as printed.

IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.

Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached) total 23 pages.

Yoshitake Shinkai, Cluster File System: HAMFS, FUJITSU, Japan, Fujitsu Limited, Jul. 9, 1999, vol. 50, No. 4, pp. 210 to 214 (stamped Citation 2 / English Translation attached) total 16 pages.

Nov. 13, 2008 Non-Final Rejection in U.S. Appl. No. 11/645,216 filed on Dec. 22, 2006.

Apr. 10, 2009 Response to Nov. 13, 2008, Non-Final Rejection in U.S. Appl. No. 11/645,216 filed on Dec. 22, 2006.

Sep. 3, 2009 Issue Notification in U.S. Appl. No. 11/645,216 filed on Dec. 22, 2006.

May 26, 2010 Issue Notification in U.S. Appl. No. 12/562,000 filed on 09-17-09.

| | | | | |
|---|---|---|---|---|
| 526 — native bytes and encoding | a [97] | ·· [204 136] | \ [92] | UTF-8 |
| 528 — convert to UTF-8 | a [97] | ·· [204 136] | \ [92] | UTF-8 |
| 530 — replace problem characters | a [97] | ·· [204 136] | \ [92] | UTF-8 |
| 532 — convert to uppercase | A [65] | ·· [204 136] | \ [92] | UTF-8 |
| 534 — normalize | Ä [195 132] | | \ [92] | UTF-8 |
| 536 — apply hash function | | 1500 | | hash value |

*FIG. 5B*

| | | | |
|---|---|---|---|
| 538 — native bytes and encoding | ä [228] | ψ [165] | Latin-1 |
| 540 — convert to UTF-8 | ä [195 164] | ψ [194 165] | UTF-8 |
| 542 — replace problem characters | ä [195 164] | \ [92] | UTF-8 |
| 544 — convert to uppercase | Ä [195 132] | \ [92] | UTF-8 |
| 546 — normalize | Ä [195 132] | \ [92] | UTF-8 |
| 548 — apply hash function | 1500 | | hash value |

*FIG. 5C*

550 — native bytes and encoding | A [65] | ·· [204 136] | \ [92] | UTF-8

552 — convert to UTF-8 | A [65] | ·· [204 136] | \ [92] | UTF-8

554 — replace problem characters | A [65] | ·· [204 136] | \ [92] | UTF-8

556 — convert to uppercase | A [65] | ·· [204 136] | \ [92] | UTF-8

558 — normalize | Ä [195 132] | | \ [92] | UTF-8

560 — apply hash function | 1500 | | | hash value

*FIG. 5D*

| | | | |
|---|---|---|---|
| 562 — native bytes and encoding | E [69] | L [76] | UTF-8 |
| 564 — convert to UTF-8 | E [69] | L [76] | UTF-8 |
| 566 — replace problem characters | E [69] | L [76] | UTF-8 |
| 568 — convert to uppercase | E [69] | L [76] | UTF-8 |
| 570 — normalize | E [69] | L [76] | UTF-8 |
| 572 — apply hash function | | 1500 | hash value |

*FIG. 5E*

| | | | | | |
|---|---|---|---|---|---|
| 574 — native bytes and encoding | | a [97] | [Invalid] [150] | \ [92] | EUC-JP |
| 576 — convert to UTF-8 | | a [97] | [Invalid] [150] | \ [92] | UTF-8 |
| 578 — replace problem characters | | a [97] | [Invalid] [150] | \ [92] | UTF-8 |
| 580 — convert to uppercase | | A [65] | [Invalid] [150] | \ [92] | UTF-8 |
| 582 — normalize | | A [65] | [Invalid] [150] | \ [92] | UTF-8 |
| 584 — apply hash function | | | 1500 | | hash value |

*FIG. 5F*

SYSTEMS AND METHODS OF DIRECTORY ENTRY ENCODINGS

PRIORITY INFORMATION

This application is a continuation of and claims benefit of priority under 35 U.S.C. §120 to U.S. patent application Ser. No. 12/562,000, filed Sep. 17, 2009, scheduled to issue as U.S. Pat. No. 7,739,288 on Jun. 15, 2010, which is a continuation of U.S. patent application Ser. No. 11/645,216, filed Dec. 22, 2006, now issued as U.S. Pat. No. 7,593,938 on Sep. 22, 2009, and entitled "Systems and Methods of Directory Entry Encodings," both of which are hereby incorporated by reference in their entirety herein.

LIMITED COPYRIGHT AUTHORIZATION

A portion of disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF THE INVENTION

The invention relates generally to directory entry encodings, and specifically, relates to supporting multiple different character encodings in the same file system.

BACKGROUND OF THE INVENTION

The increase in the amount of data stored on digital computing systems has resulted in complex storage systems. One method for organizing data has been to store them in electronic files. These files are then grouped into directories with some directories including other directories and/or files. Typically, files and directories are assigned unique identifiers within the file system. In most systems, files and directories are arranged in order to optimize the lookup of a unique identifier given the particular path or name of the file or directory.

In some circumstances, it may be desirable to provide a file system that may be accessed by client processes using multiple different character encodings. It can be problematic to provide a file system that supports access to filenames created with multiple different character encodings. Because of the foregoing challenges and limitations, there is a need to provide a file system that supports access to files named with multiple different character encodings.

SUMMARY OF THE INVENTION

The embodiments disclosed herein generally relate to providing a system that supports access to files named in multiple different character encodings. For purposes of this summary, certain aspects, advantages, and other features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages which may be taught or suggested herein.

In one embodiment, a system for filename lookup that supports multiple character encodings is provided. The system includes a module configured to store filename data in a first character encoding into an indexed data structure; to receive filename data in a second encoding; and to lookup filename data in the indexed data structure using the second encoding.

In another embodiment, a file system with filename lookup that supports multiple character encodings is provided. The file system includes an indexed data structure indexed by a value based on a first character encoding, said indexed data structure comprising a plurality of entries corresponding to respective filenames in the file system, said entries comprising an encoding tag identifying a respective second character encoding and a filename stored in the respective second character encoding.

In another embodiment, a method for filename lookup that supports multiple character encodings is provided. The method includes converting a filename from an encoding of a requester to a hashed value based on a standard encoding; navigating to entries within an indexed data structure that correspond to the hashed value; for the entries that correspond to the hashed value, comparing filename data stored in the entries to the filename; and determining the best match filename, if any, between the filenames stored in the entries and the filename.

BRIEF DESCRIPTION OF THE DRAWINGS

FIGS. 5A-1, 5A-2, 5B, 5C, 5D, 5E, and 5F illustrate embodiments of example character encoding conversions.

Figure 1:
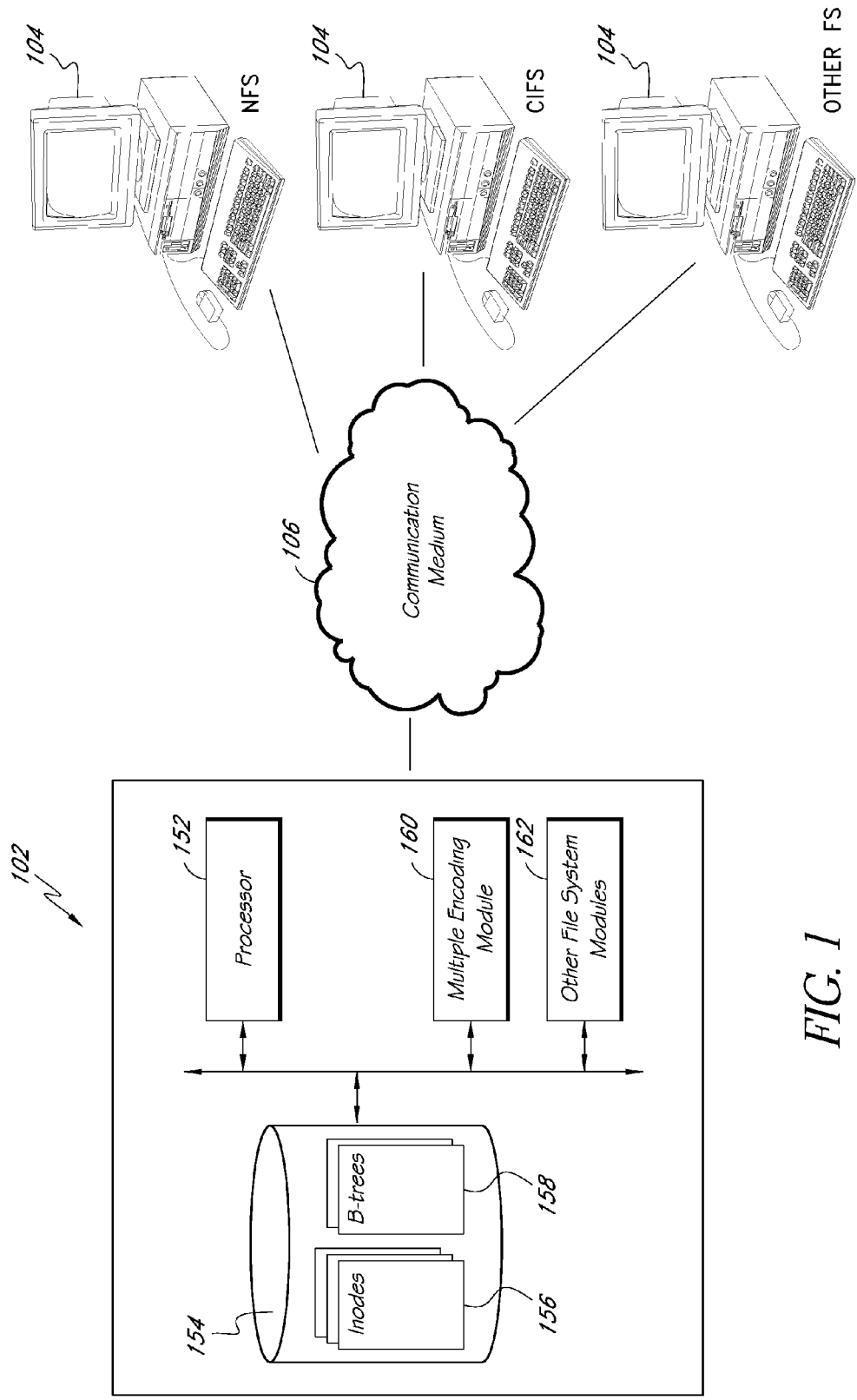
FIG. 1 illustrates one embodiment of a computing system that provides a file system supporting access to files named with multiple different character encodings.

These and other features will now be described with reference to the drawings summarized above. The drawings and the associated descriptions are provided to illustrate the embodiments of the invention and not to limit the scope of the invention. Throughout the drawings, reference numbers may be re-used to indicate correspondence between referenced elements. In addition, the first digit of each reference number generally indicates the figure in which the element first appears.

DETAILED DESCRIPTION OF PREFERRED EMBODIMENTS

Systems and methods which represent one embodiment of an example application of the invention will now be described with reference to the drawings. Variations to the systems and methods which represent other embodiments will also be described. The present invention is not limited by the type of environment in which the systems and methods are used, however, and the systems and methods may be used in other environments, such as, for example, other file systems, virtual file systems, distributed systems, the Internet, the Worldwide Web, a private network for a hospital, a broadcast network for a government agency, and an internal network for a corporate enterprise, and intranet, a local area network (LAN), a wide area network (WAN), a wired network, a wireless network, and so forth. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the claims.

Embodiments of a file system suitable for accommodating, as described herein, the methods and systems for supporting multiple different character encodings are disclosed in U.S. patent application Ser. No. 10/007,003, titled, "SYSTEMS AND METHODS FOR PROVIDING A DISTRIBUTED FILE SYSTEM UTILIZING METADATA TO TRACK INFORMATION ABOUT DATA STORED THROUGHOUT THE SYSTEM," filed Nov. 9, 2001 which claims priority to Application No. 60/309,803 filed Aug. 3, 2001; U.S. Pat. No. 7,146,524 entitled "SYSTEMS AND METHODS FOR PROVIDING A DISTRIBUTED FILE SYSTEM INCORPORATING A VIRTUAL HOT SPARE," filed Oct. 25, 2002, and issued on Dec. 5, 2006; and U.S. patent application Ser. No. 10/714,326 entitled "SYSTEMS AND METHODS FOR RESTRIPING FILES IN A DISTRIBUTED FILE SYSTEM," filed Nov. 14, 2003, which claims priority to Application No. 60/426,464, filed Nov. 14, 2002, all of which are hereby incorporated herein by reference in their entirety.

I. Overview

When a file is stored on a computer system, the user typically assigns the file a name using a character set, also known as an encoding. One well-known character encoding is the American Standard Code for Information Interchange ("ASCII") encoding. ASCII characters are defined by a seven-bit binary number. Many file system users use character encodings beyond the normal seven-bit ASCII range. Over the years, many different methods have been developed to encode various languages. Although there have been attempts to standardize these encodings through Unicode, there remain for various technical, historical, and social reasons a very wide array of encoding standards still actively in use. Traditionally, most languages had one or more different character sets that were used on different operating systems, or simply by different customers, to represent characters important for that language. For example, in Japan, both the EUC-JP and SHIFT-JIS character sets are reasonably common. These character sets cover many of the same characters but use different byte representations for these characters. As one example, HIRAGANA letter KA is represented with the bytes [164 171] in EUC-JP, the bytes [130 169] in SHIFT-JIS, and the bytes [227 129 139] in the UTF-8 encoding of Unicode. Supporting multiple character encodings in a single file system can be problematic.

Although the embodiments herein are not specific to a distributed file system, the features of the described embodiments may be implemented in a distributed system. In general, a distributed file system includes one or more nodes. In one embodiment, a user of a client device is connected to a file system comprised of one or more physical nodes (for example, storage devices). In this embodiment, the data on each of the physical nodes is arranged according to inodes which store metadata corresponding to the respective files and directories within the file system. Typically, when a client device desires to access a specific file stored on the file system, the client device requests the file by its name and/or some other mutable identifier. The system then performs a lookup in order to identify the inode that corresponds to the requested file.

As used herein, a file is a collection of data that, in some embodiments, is stored in one or more units and is related to a file identifier or a filename. A directory, similar to a file, is a collection of data that, in some embodiments, is stored in one or more units and is related to a directory identifier or a directory name. A directory, however, is a specialized collection of data relating to elements in a file system. In one embodiment, a file system is organized in a tree-like structure. Directories are organized like the branches of trees. Directories may begin with a root directory and/or may include other branching directories. Files resemble the leaves or the fruit of the tree. Files, typically, do not include other elements of the file system, such as files and directories. In other words, files do not typically branch. However, in other embodiments, the files may branch.

The embodiments disclosed herein may be implemented using a file system that includes directories represented by a map data structure, and each map data structure may include ten, hundreds, or billions of entries. In some directory implementations, a B–tree based directory structure may improve directory lookup performance. B–tree based data structures allow the presence or absence of a filename in a directory to be determined by searching only a small portion of the entries in the directory. In particular, lookup in a B–tree based directory is O(log n) rather than O(n), where n is the number of entries in the directory.

In one embodiment, a tree-based directory may be indexed with a fixed-size hash of the filename. The hash is computed by a fixed mathematical operation over the bytes that make up the filename. In some file systems, the exact bytes of the filename may be stored in their respective tree entry. This may be problematic, however, for different file system users that are operating in environments using different conventions for encoding filenames. For example, the Windows operating system expects all filenames to be represented as Unicode strings. Unicode defines a set of mappings for how to interpret multi-byte values as corresponding to specific logical characters in most of the world's languages. On the other hand, many users of the Network File System (NFS) protocol work in environments which use different mapping tables to convert bytes to specific characters. As one example, many Japanese environments may for various reasons use a standard, such as EUC-JP, that is designed specifically to encode characters of interest when writing in Japanese. It is desirable to implement a directory structure that allows the lookup of names in one or more encodings used by customers of the file system. Furthermore, it is also desirable to implement a file system that allows a user accessing a file system with one encoding to be able to logically interpret filenames created by another user in a different encoding and access these files.

In one embodiment, a B–tree based encoding-preserving directory provides a file system with the support for multiple different character encodings. In some file systems, filenames are assumed to be in a certain encoding. In the illustrated embodiments, however, filenames are stored as submitted by the user, even though the encoding may be different. In one embodiment, the filenames are stored in the directory using the actual bytes provided by the client process, and the names are paired with respective numeric tags indicating the encoding used by the client. In one embodiment, this encoding tag is normally not visible to file system users and is generally inferred based on configurable settings for the particular access mechanism or client process (such as, for example, NFS, CIFS, FTP, HTTP, WebDAV and so forth) used to access the file system. In one embodiment, the name is converted from the accessor's encoding to Unicode, the converted name is regularized, and then the regularized version is hashed to generate a key for the B-tree. To lookup a name, the name being looked up is converted to Unicode, the converted name is regularized, the regularized name is hashed, and the resulting hash index is used to look for entries in the B-tree with the same hash value. If there is at least one corresponding entry, the names of the entries with that hash are converted to the encoding of the requesting client and string comparisons are performed with the client's filename. If there is a match, the lookup is a success. If there is no match, the lookup is a failure. Filenames and/or directories may be created, opened, and listed using the lookup operation.

II. System Architecture

FIG. 1 illustrates one embodiment of a computer system that provides a file system that supports access to files named with multiple different character encodings. File system computer 102 is accessible to client computers 104 through communication medium 106. In the illustrated embodiment, the file system is stored and executed on a single computing device, file system computer 102. In other embodiments, the file system may be a distributed file system, implemented on a plurality of computing nodes. In the illustrated embodiment, file system computer 102 may run on a personal computer, a work station, a main frame computer, a smart storage device, and so forth. If the file system is implemented as a distributed file system, the system may comprise a cluster of computing devices, such as smart storage devices, connected through a communication medium, such as a network. In the illustrated embodiment, client computers 104 include different file system access protocols, such as the Network File System (NFS), the Common Internet File System (CIFS), File Transfer Protocol (FTP), Hypertext Transfer Protocol (HTTP), and Web-based Distributed Authoring and Versioning, and or other file system access protocols. Client computers 104 may represent application processes, individual computing devices, a network of computing devices, and so forth. The communication medium 107 may be one or more networks, including, for example, the Internet, a local area network (LAN), a wide area network (WAN), a wireless network, a wired network, an intranet, and so forth.

In the illustrated embodiment, file system computer 102 comprises a processor 152, a storage device 154 for the file system data, and a multiple encoding module 160 and other file system modules 162. Storage device 154 comprises inodes 156 and B-trees 158. These data structures are components of the multiple encoding file system. In the illustrated embodiment, inodes 156 are metadata structures used to locate, monitor, and/or manipulate files and directories within the file system. An inode is a data structure that describes a file or directory and may be stored in a variety of locations, including on long term storage and/or in system memory. An in-memory inode may include a copy of data stored in long term storage plus additional data used by the system, including fields associated with the data structure. Although the illustrated embodiment describes a file system that includes inodes to locate, monitor, and/or manipulate file and directory data within the file system, in other embodiments other data structures may be used. In some embodiments, files and directories may be located, monitored, and/or manipulated without the use of data structures such as inodes.

In one embodiment, the storage device 154 also stores a mapping data structure for the inodes that corresponds to a directory in a file system. In the illustrated embodiment, the mapping data structure is implemented using a B-tree structure. Thus, data storage device 154 stores B-trees 158. It will be appreciated by one skilled in the art that other data structures may be used, such as, for example, B+ trees, Patricia tries, red-black trees, and/or flat-file directories. In some embodiments, the data structures are ordered data structures and, in other embodiment, the data structures are unordered. Furthermore, in some embodiments, the data structures support efficient lookup, such as O(log n) efficiency, and, in other embodiments, the data structures support less efficient lookup, such as O(n) efficiency. Different combinations of order and efficiency are also possible. Thus, the data structures may, for example, be ordered and support either efficient lookup or less efficient lookup. Moreover, the data structures may be unordered and support either efficient lookup or less efficient lookup. Some data structures may even be ordered in varying degrees and/or support lookup in varying degrees of efficiencies. It will be appreciated by one skilled in the art that many suitable data structures may be used to embody features described herein.

Data structures are collections of associated data elements, such as a group or a set of variables or parameters. In one embodiment, a structure may be implemented as a C-language "struct." One skilled in the art will appreciate that many suitable data structures may be used.

In one embodiment, the file system computer 102 may be implemented using a variety of computer systems such as, for example, a computer, a server, a smart storage unit, a mobile telephone, a handheld device, an embedded device, and so forth. In one embodiment, the computer may be a general purpose computer using one or more microprocessors, such as, for example, a Pentium® processor, a Pentium® II processor, a Pentium® Pro processor, a Pentium® IV processor, a Pentium® D processor, a Pentium® Core™ processor, an xx86 processor, an 8051 processor, a MIPS processor, a Power PC processor, a SPARC processor, an Alpha processor, and so forth. The computer may run a variety of operating systems that perform standard operating system functions such opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® WindowsR XP, Palm Pilot OS, Apple® MacOS®, Disk Operating System (DOS), UNIX, IRIX, Solaris, SunOS, FreeBSD, Linux®, or IBM® OS/2® operating systems.

File system modules include program instructions for operating and executing the file system. Multiple encoding module 160 includes the instructions relevant to supporting access to files named with multiple different character encodings. The other file system modules 162 include instructions for other functions of the file system. Although in the illustrated embodiment, there are multiple file system modules, in other embodiments there may be a single module, where the modules may be arranged in various suitable organizations. Furthermore, although in the illustrated embodiment, the file system modules are illustrated residing outside of data storage device 154. In other embodiments, one or more of the file system modules may be stored in whole or in part on data storage device 154 with the inodes 156 and B-trees 158.

In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

III. B-Tree Data Structures

Figure 2A:
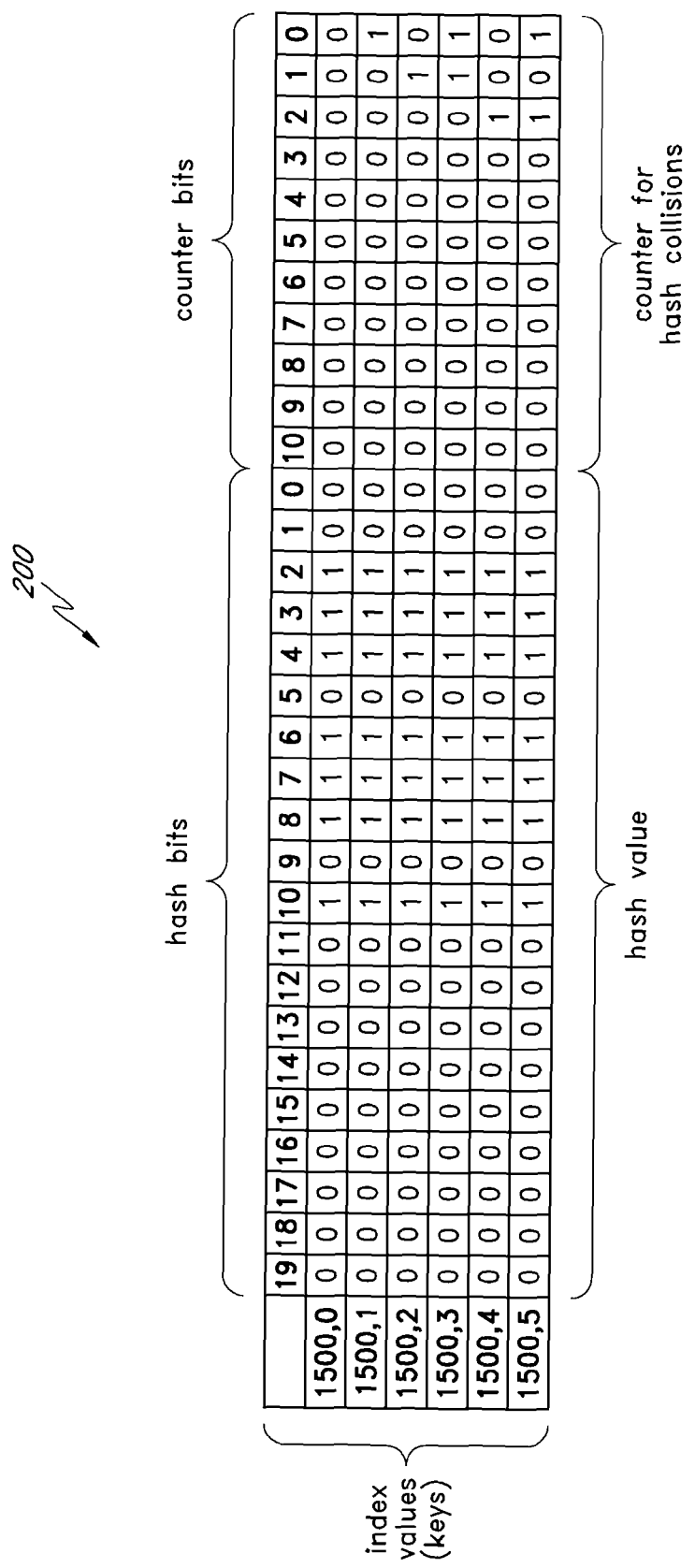
FIGS. 2A, 2B, and 2C illustrate one embodiment of a B–tree and B–tree-related data corresponding to a particular directory in a file system that supports access to files named with multiple different character encodings.
Figure 2B:
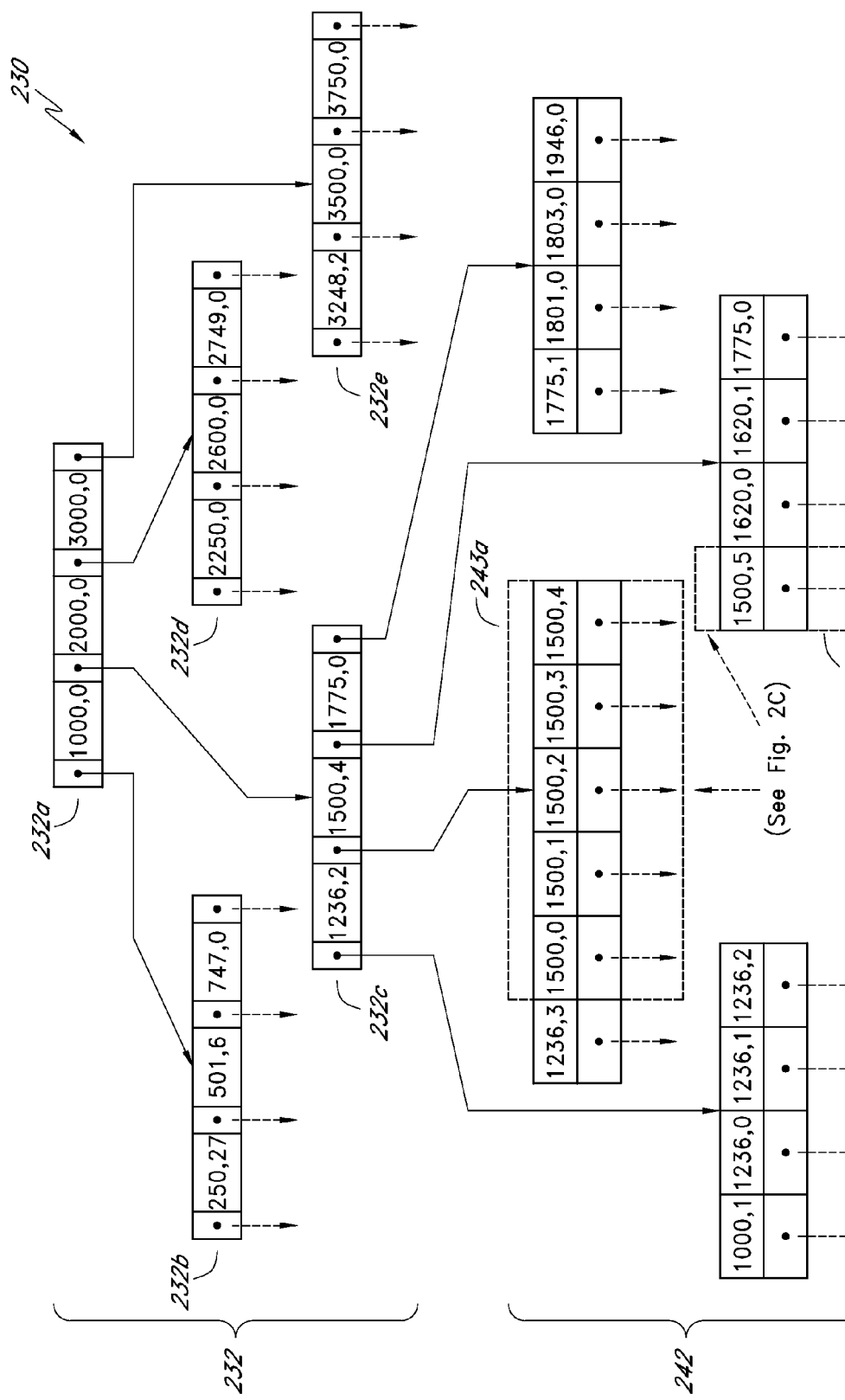
Figure 2C:
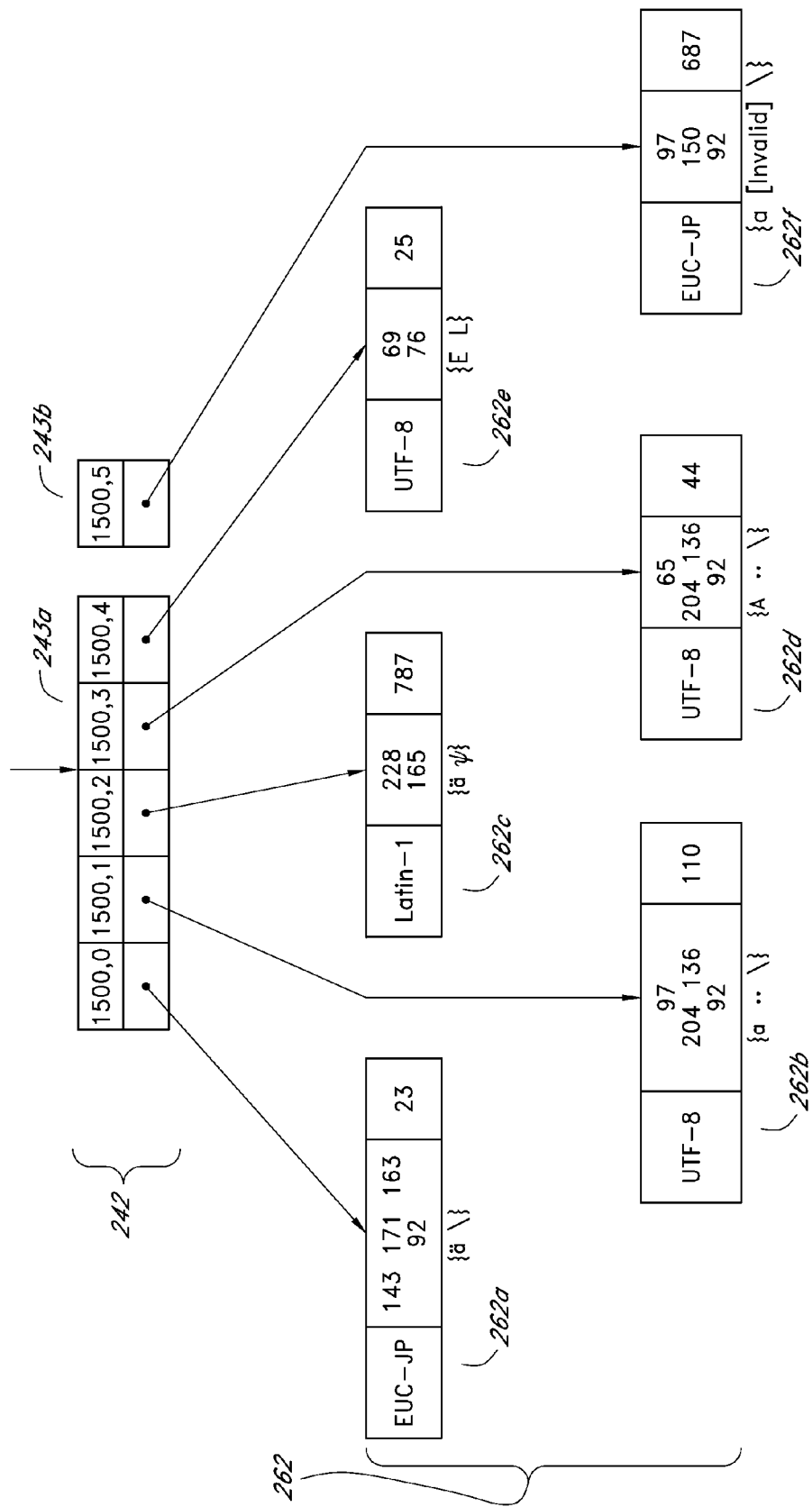

FIGS. 2A, 2B, and 2C illustrate one embodiment of a B-tree and related data corresponding to a particular directory in a file system that supports access to filenames created with multiple different character encodings. FIG. 2A illustrates one embodiment of index values for a B-tree which is a data structure that represents sorted data in a way that allows for insertion and removal of elements. B-trees are dynamic, allowing elements to be added and removed. B-trees can be multi-level data structures, comprising internal nodes that organize the data and leaf nodes that point to the stored elements in the tree. In a special type of B-tree, called a B+tree, the internal nodes include only keys (or index values) and tree pointers, which point to other nodes in the tree. All of the leaf nodes are at the same lowest level, and they are linked together as a linked list, which allows the leaves to be searched in order. To reduce the search time necessary for an in-order search of the leaf nodes, the B-tree may be traversed using the keys of the tree. Internal nodes have maximum and minimum values that define the ranges of possible key values that respective tree pointers of the internal node may point to.

FIG. 2A illustrates a table of index values for a group of elements stored in one of the B-trees of the file system. In the illustrated embodiment, the index value is a 31 bit string. The first 20 bits comprise a hash value. The hash value is determined by applying a hash function to a filename. In one embodiment, the filename transmitted by the requesting process may be translated from the encoding of the requesting process to a common encoding used by the file system. In the illustrated embodiment, the six hash values are identical. Different filenames may hash to the same value. In the illustrated embodiment, six different filenames have been hashed to the same value of 1500. The remaining 11 bits of the index (or key) comprise a counter for resolving hash collisions. In one embodiment, the counters are unique for every entry, ensuring that no index value will be identical, even though hash values may be identical. In the illustrated embodiment, the counter values range from 0 to 5. Elements in the respective B-tree are organized according to their index (or key) value. It is recognized that FIG. 2A illustrates one embodiment of an index and that other indexes of various sizes may be used with or without a counter and/or hash value. Additionally and/or alternatively, index values may be stored in a different format. Furthermore, the counter portion of the B-tree index (or key) values is not necessarily a count of entries having the same hash value. In some embodiments, the counter is the lowest unused number available for the given hash. Because directory entries may be deleted as well as added, introducing holes in the number space, in one embodiment, the counter values can be allocated in any suitable way that makes them constant for their lifetime and unique. In other words, counter values are not moved once allocated, though they may be deleted along with their respective directory entries, and they are unique values. In one embodiment, a "first-fit" algorithm is used to allocate these values; in other embodiments, other suitable algorithms may be used.

FIG. 2B illustrates a B-tree for a directory in a file system that supports multiple different character encodings. B-tree 230 is a 2-level B-tree. The internal nodes 232 organize the elements of the B-tree according to their respective index values (or keys). The leaf nodes 242 correspond to respective data elements of the B-tree. In other words, the leaf nodes organize the actual data being stored in the B-tree, and the internal nodes provide a system of lookup for the data elements stored in the leaf nodes. The internal nodes 232 are organized according to a set of ranges of index (or key) values. The top-most internal node 232a (or the root node) divides the B-tree 230 into four different ranges: 0,0 to 1000,0 (internal node 232b); 1000,1 to 2000,0 (internal node 232c); 2000,1 to 3000,0 (internal node 232d); and 3000,1 and up (internal node 232e). Each one of these ranges corresponds to one of four internal nodes 232 in the second level of the B-tree 230. The internal nodes 232 in the second level of the B-tree 230 further divide their respective ranges into four more ranges, yielding a total of 16 ranges in the B-tree 230. For example, the internal node 232c corresponding to the range of index (or key) values 1000,1 to 2000,0 is divided into four ranges: 1000,1 to 1236,2; 1236,3 to 1500,4; 1500,5 to 1775,0; and 1775,1 to 2000,0. B-trees are organized so that values to the left of the index are less than or equal to the index, and values to the right of the index are greater than the index.

FIG. 2C illustrates the six leaf nodes 242 corresponding to the hash value of 1500. There are six elements in the B-tree 230 corresponding to the hash value 1500. These elements correspond to filenames with hash values of 1500. Because six different filenames hash to the same value, there is a need to distinguish between the six elements in the file system. Thus, as a new element is added to the same hash bucket, it is assigned a key value corresponding to the next increment or counter. (A hash bucket is a logical grouping of all the leaf nodes and corresponding data elements that are indexed by the same hash value.) In the illustrated embodiment, the logical hash bucket for the hash value 1500 has six entries, the entries corresponding to individual filenames in the B-tree 230. These six entries span two different groups of leaf nodes 242. The first five entries 243a are included in a different group of leaf nodes 242 than the remaining sixth entry 243b. While the illustrated embodiment includes a counter, it is recognized that other methods of storing multiple entries may be used, such as, for example, a linked list, an array, and so forth.

There are six data elements 262 corresponding to the six leaf nodes 242. The data elements 262 comprise an encoding tag identifying the encoding of the process that requested or created the filename; a string of byte values corresponding to the native bytes of the requesting process; and a reference or address data for locating the file data associated with the respective filename. In one embodiment, the reference is a logical inode number (LIN), which identifies the inode corresponding to the respective filename.

The leaf node 242 identified by the index (or key) value of 1500,0 corresponds to the filename "ä\". The data element 262a for this filename includes information regarding this filename and its associated inode. First, the data element 262a includes an identifier for the encoding of the process that created the file. For the filename "ä\", the encoding of the requesting process is EUC-JP. Second, the data element 262a also includes the original byte values of the filename when the file was created, as requested by the creating process. In other words, the file system stores the original bytes of the filename as requested by the user process. Although, as discussed in further detail below, the original byte values are converted by an algorithm for indexing the filenames in the file system, the filenames themselves are stored in their original form. Thus, the data element 262a stores the byte values [143 171 163] and [92], which are the respective byte values for "ä" and "\" in the character encoding EUC-JP. Third, the data element 262a stores a logical inode number (LIN), which is a unique identifier for the inode corresponding to the filename associated with the respective data element 262.

Thus, the respective data elements 262 store the following data. The data element 262b corresponding to the index (or key) value 1500,1 includes an identifier indicating that the filename was created by a process using the UTF-8 character encoding; stores the byte values [97], [204 136], and [92], which represent respectively the characters "a", "≅", and "\" in the UTF-8 character encoding; and stores the LIN 110. The data element 262c corresponding to the index (or key) value 1500,2 includes an identifier indicating that the filename was created by a process using the Latin-1 character encoding; stores the byte values [228] and [165], which represent respectively the characters "ä", and "¥" in the Latin-1 character encoding; and stores the LIN 787. The data element 262d corresponding to the index (or key) value 1500,3 includes an identifier indicating that the filename was created by a process using the UTF-8 character encoding; stores the byte values [65], [204 136], and [92], which represent respectively the characters "A", "≅", and "\" in the UTF-8 character encoding; and stores the LIN 44. The data element 262e corresponding to the index (or key) value 1500,4 includes an identifier indicating that the filename was created by a process using the UTF-8 character encoding; stores the byte values [69] and [76], which represent respectively the characters "E", and "L" in the UTF-8 character encoding; and stores the LIN 25. The data element 262f corresponding to the index (or key) value 1500,5 includes an identifier indicating that the filename was created by a process using the EUC-JP character encoding; stores the byte values [97], [150], and [92], which represent respectively the characters "a", "[Invalid]" and "\" in the UTF-8 character encoding; and stores the LIN 687.

IV. Methods

Figure 3A:
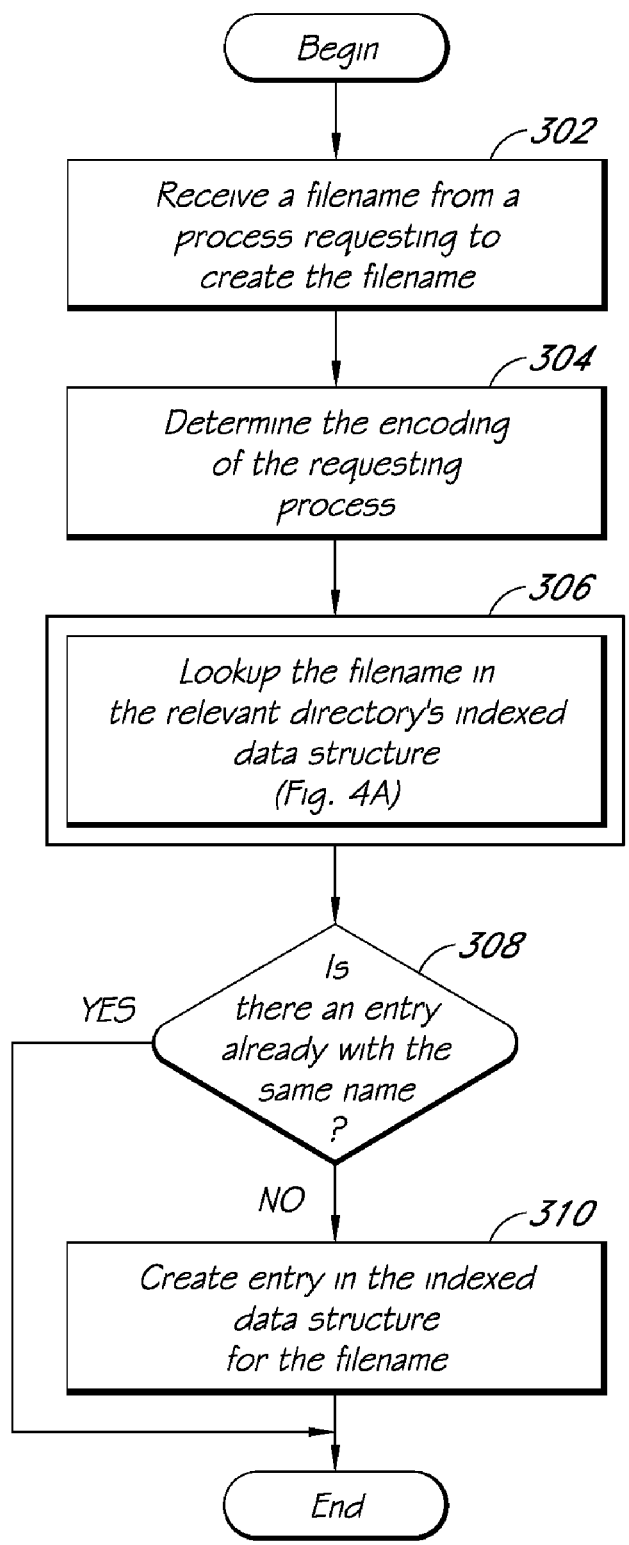
FIGS. 3A, 3B, and 3C illustrate flowcharts of embodiments of creating, opening, and listing the contents of a directory in a file system that supports access to files named with multiple different character encodings.
Figure 3B:
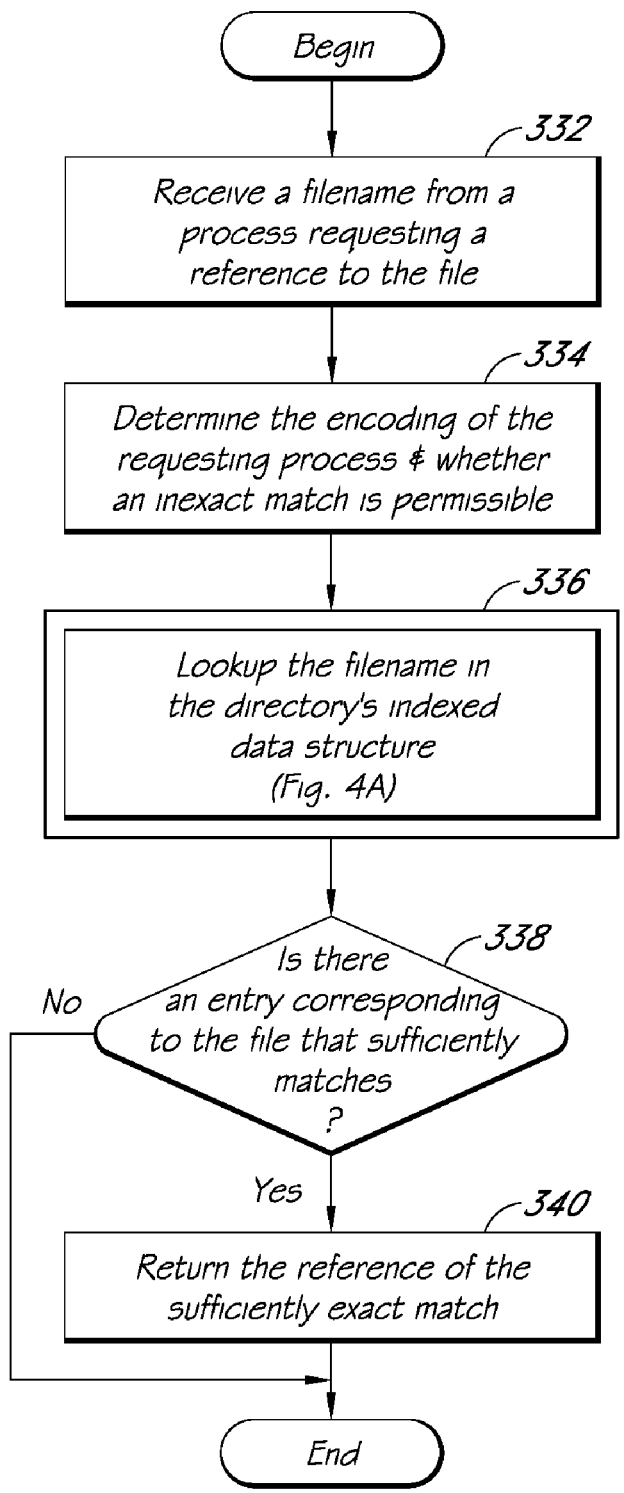
Figure 3C:
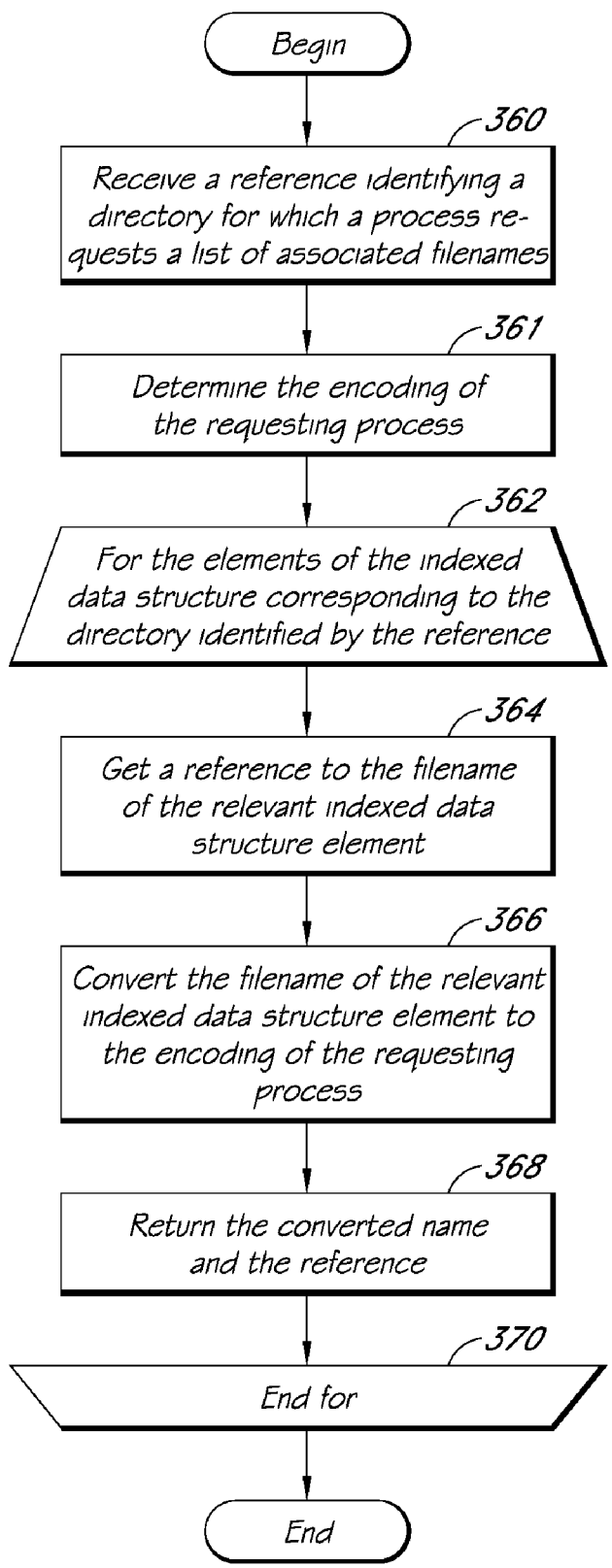

FIGS. 3A, 3B, and 3C illustrate embodiments of creating, opening, and listing the contents of a directory in a file system that supports access to filenames created with multiple different character encodings. FIG. 3A illustrates a flow chart of one embodiment of creating a filename in a directory. In state 302, the multiple encoding module 160 receives a filename from a process requesting to create the filename in a particular directory. In state 304, the multiple encoding module 160 determines the encoding of the requesting process. For example, the requesting process may be a Windows client operating in the UTF-8 character encoding. Possible character encodings may include, but are not limited to, UTF-8, UTF-8-MAC, EUC-JP, EUC-JP-MS, SHIFT-JIS, LATIN-1, ASCII, and so forth. In state 306, the multiple encoding module 160 attempts to lookup the filename in the particular directory's B-tree. Although in the illustrated embodiment, the filenames within a directory are organized in a B-tree, in other embodiments, the directory's contents may be organized in other indexed data structures, such as Patricia tries, red-black trees, and/or flat-file directories. If, as determined in state 308, there is an entry already with the same filename, then a new entry is not created. In some embodiments, the multiple encoding module 160 may return a message to the requesting process indicating that the name already exists in the file system. If there is not an entry already with the same name in the file system, then the multiple encoding module 160, in state 310, creates an entry in the directory's B-tree. The entry (or element) of the B-tree stores an identifier for the encoding of the requesting process, the original byte values of the filename requested, and a reference (or address data) of the file data associated with the filename. In one embodiment, the reference is a logical inode number (LIN) which indicates the inode or metadata of the file associated with the filename. In other embodiments, the reference may be another suitable identifier or address to locate the associated file data. Furthermore, in other embodiments, the multiple encoding module 160 may allow multiple files with the same name to be stored in the B-tree and/or may append an identifier onto the name to make it unique. In addition, other file system modules may handle the creation of the file data (such as an inode) for the newly created file in the file system.

FIG. 3B illustrates a flow chart of one embodiment of requesting a reference to a file in the file system. In state 332, the multiple encoding module 160 receives a filename from a process requesting a reference, which may be a logical inode number (LIN) or some other reference of a particular file in the file system. In state 334, the multiple encoding module 160 determines the encoding of the requesting process. In state 334, the multiple encoding module 160 also determines whether an inexact match is permissible. In one embodiment, the allowable inexact matches are compatible with the regularization used to determine the respective hash value, which is described in greater detail below with reference to FIG. 4C. Thus, the multiple encoding module 160 may permit, for example, case insensitive lookups and normalization insensitive lookups. In some embodiments, the multiple encoding module 160 may additionally and/or alternatively permit an inexact match based on a list of characters that are skipped during filename comparison. This list may be access protocol specific, including, for example, NFS version 4, and so forth.

In state 336, the multiple encoding module 160 attempts to lookup the filename in the directory's B-tree. This operation is described in greater detail below with reference to FIG. 4A. If, as determined in state 338, there is an entry corresponding to the file that sufficiently matches, then the multiple encoding module 160 returns the LIN (or other reference) of the file of the sufficiently exact match, in state 340. If there is no sufficient match, then the multiple encoding module 160 does not return a LIN (or other reference). In some embodiments, the multiple encoding module 160 may return a message indicating that no sufficiently exact match for the filename was found in the file system.

FIG. 3C illustrates a flow chart of one embodiment of listing the contents of a directory. In state 360, the multiple encoding module 160 receives a LIN (or other reference) identifying a directory for which a process requests a list of associated filenames. In state 361, the multiple encoding module 160 determines the encoding of the requesting process. The states between state 362 and state 370 are repeated for the elements of the B-tree corresponding to the directory identified by the LIN (or other reference). In other words, the multiple encoding module 160 traverses the B-tree corresponding to the directory identified by the LIN (or other reference) and performs the operations described in states 364, 366, and 368. In state 364, the multiple encoding module 160 gets a LIN (or other reference) for the filename of the relevant data element. In state 366, the multiple encoding module 160 converts the filename of the relevant data element to the encoding of the requesting process. If the saved byte values for the filename include values that cannot be translated into a valid character in the encoding of the requesting process, the multiple encoding module 160 substitutes a default character, such as "#", in place of the untranslatable byte(s). In state 368, the multiple encoding module 160 returns the converted name and the LIN (or other reference).

In other embodiments, untranslatable characters may be handled differently. For example, an escaping sequence (such as the ASCII string "\136") may be used, in some embodiments, to note characters in such a way that the escaping can be reversed. Additionally and/or alternatively, a filename with an untranslatable character may be escaped, in some embodiments, in some arbitrary but unique manner. For example, a random filename may be returned and then remembered. Future lookup operations may check a table (such as a table of remembered, random filenames) in addition to the "real" entries. In some embodiments, the returned filename may be a combination of a hash/collision value with a random string, which may allow for the normal lookup operation (by returning a hash/collision value) while also avoiding the problem of name collision (by providing a random string).

Figure 4A:
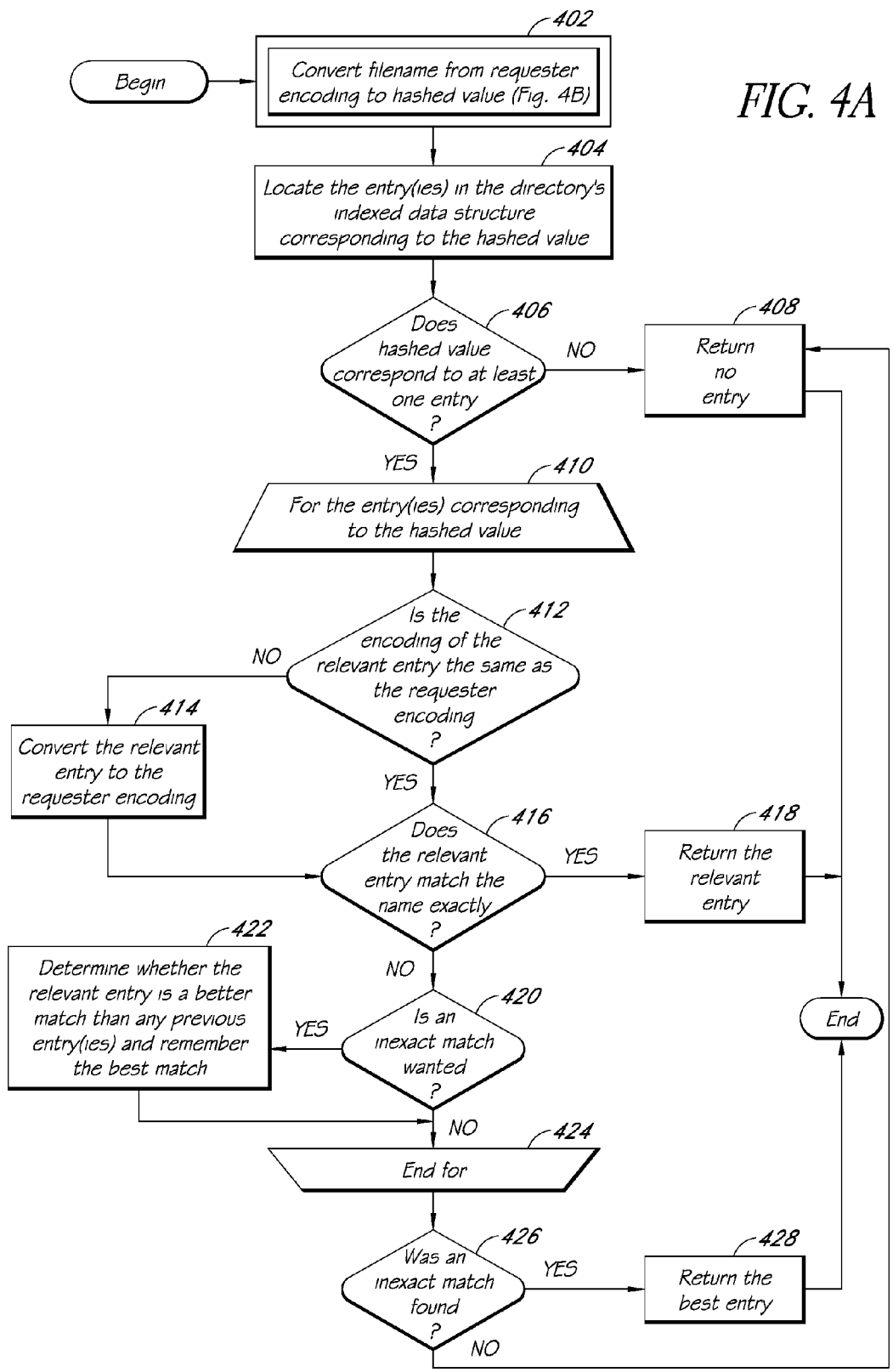
FIGS. 4A, 4B, 4C, 4D, and 4E illustrate flowcharts of one embodiment of looking up a filename in a directory of a file system that supports access to files named with multiple different character encodings.

FIGS. 4A, 4B, 4C, 4D, and 4E illustrate flowcharts of one embodiment of looking up a filename in a directory of a file system that support access to filenames created with multiple character encodings. FIG. 4A illustrates one embodiment of the overall flowchart for the lookup operation. In state 402, the multiple encoding module 160 converts the filename from the requester's encoding to a hashed value. These operations are described in more detail below with reference to FIGS. 4B and 4C. In state 404, the multiple encoding module 160 locates the entry(ies) in the directory's B-tree that corresponds to the hashed value. To locate the entry(ies) in the B-tree, the B-tree is traversed from the root node down to the leaf node(s) corresponding to the hashed value of the converted filename. If, as determined in state 406, the hashed value of the converted filename does not correspond to at least one entry in the B-tree, then the multiple encoding module 160, in state 408, returns to the requesting process a message that there is no entry with the requested filename. If, as determined in state 406, the hashed value of the converted filename does correspond to at least one entry in the B-tree, then the operations described in the states between state 410 and state 424 are repeated for the entry(ies) corresponding to the hashed value. For the operations between the states 410 and 424, the relevant entry is the current entry that the multiple encoding module 160 is performing the operations on. If, as determined in state 412, the encoding of the relevant entry is the same as the requester's encoding, then the multiple encoding module 160 proceeds to state 416. If the encoding of the relevant entry is not the same as the requester encoding, then the multiple encoding module 160, in state 414, converts the relevant entry to the requester's encoding.

If, as determined in state 416, the relevant entry matches the filename exactly, then the multiple encoding module 160 returns the relevant entry in state 418. If the relevant entry does not match the filename exactly, then the multiple encoding module 160 proceeds to state 420. If, as determined in state 420, an inexact match is wanted then the multiple encoding module 160 determines whether the relevant entry is a better match than in a previous entry(ies), and the multiple encoding module 160 remembers the best match, in state 422. If an inexact match is not wanted then the multiple encoding module 160 proceeds to the end of the operations repeated for the entry(ies) corresponding to the hash values. After the entry(ies) corresponding to the hash value have been evaluated, the multiple encoding module 160 determines whether an inexact match was found. If an inexact match was found, as determined in state 426, then the multiple encoding module 160 returns the best matching entry, in state 428. If no inexact match was found the multiple encoding module 160 returns a message indicating that no entry was found, in state 408.

Figure 4B:
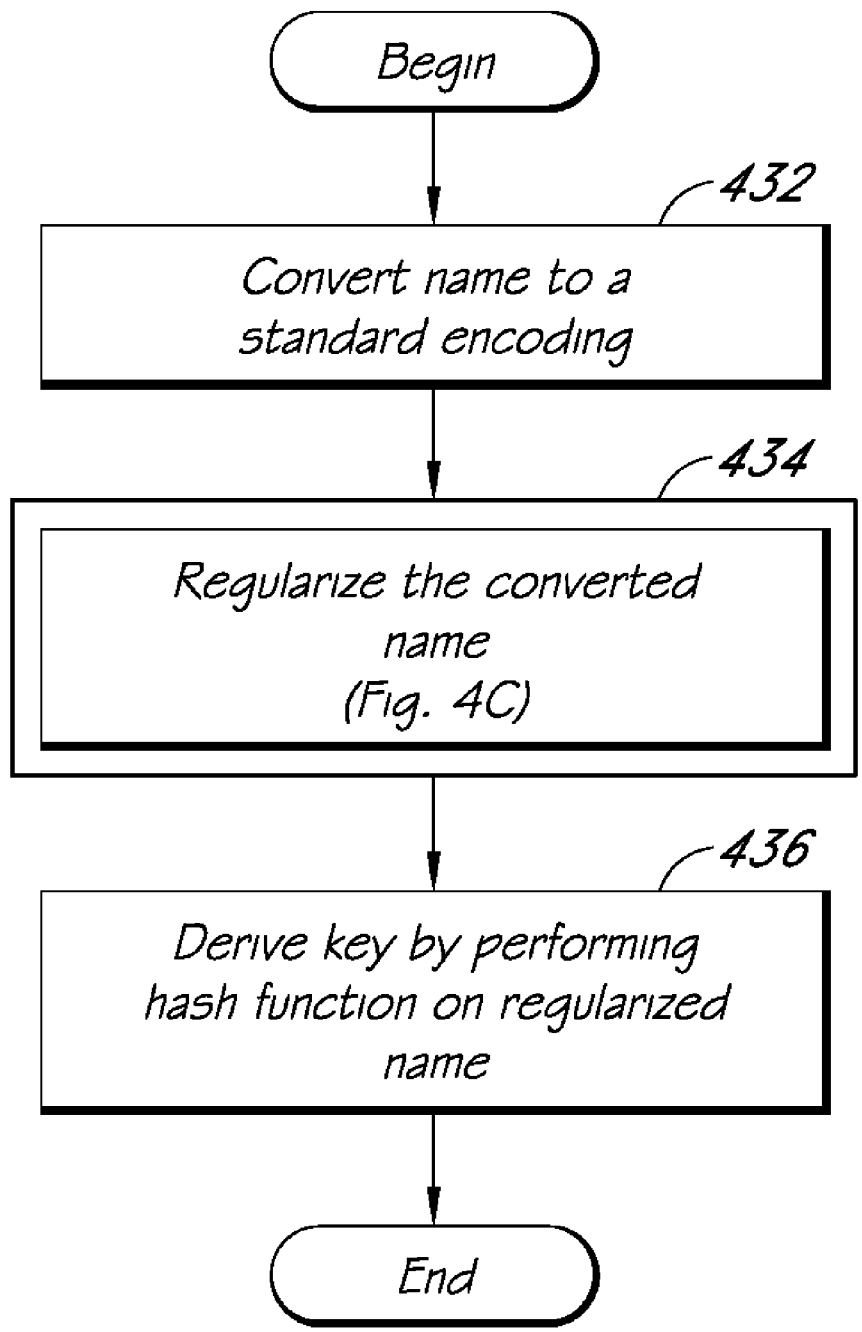

FIG. 4B illustrates a flowchart of one embodiment of converting, regularizing, and hashing a filename. In state 432 the multiple encoding module 160 converts the filename provided by the requesting process to a standard encoding. For example, the standard encoding may be a Unicode encoding, such as UTF-8. If a requesting process operates in a different encoding from the standard encoding, the multiple encoding module 160 converts the filename to the standard encoding. In one embodiment, the conversion to a standard encoding is accomplished by referencing an algorithm for converting characters from a particular encoding to the standard encoding. In other embodiments, a static table or database may be used to convert character encodings. The multiple encoding module 160 remembers the original byte values for the filename, as these byte values are the byte values that are stored. Thus, the converted name is stored temporarily in memory, in one embodiment. In state 434, the multiple encoding module 160 regularizes the converted name. Embodiment of regularizing operations are discussed in greater detail below with reference to FIG. 4C. In state 436, the multiple encoding module 160 derives the index (or key) for the filename by performing a hash function on the regularized name. In one embodiment, a hash function is an algorithm that yields a value between a certain range of values. Thus, when the regularized name is "hashed" the result is a value within a range of values defined by the hash function. In the illustrated embodiment, the hash function yields a hash value between 0 and 1,048,575, corresponding to a 20 bit hash value.

Figure 4C:
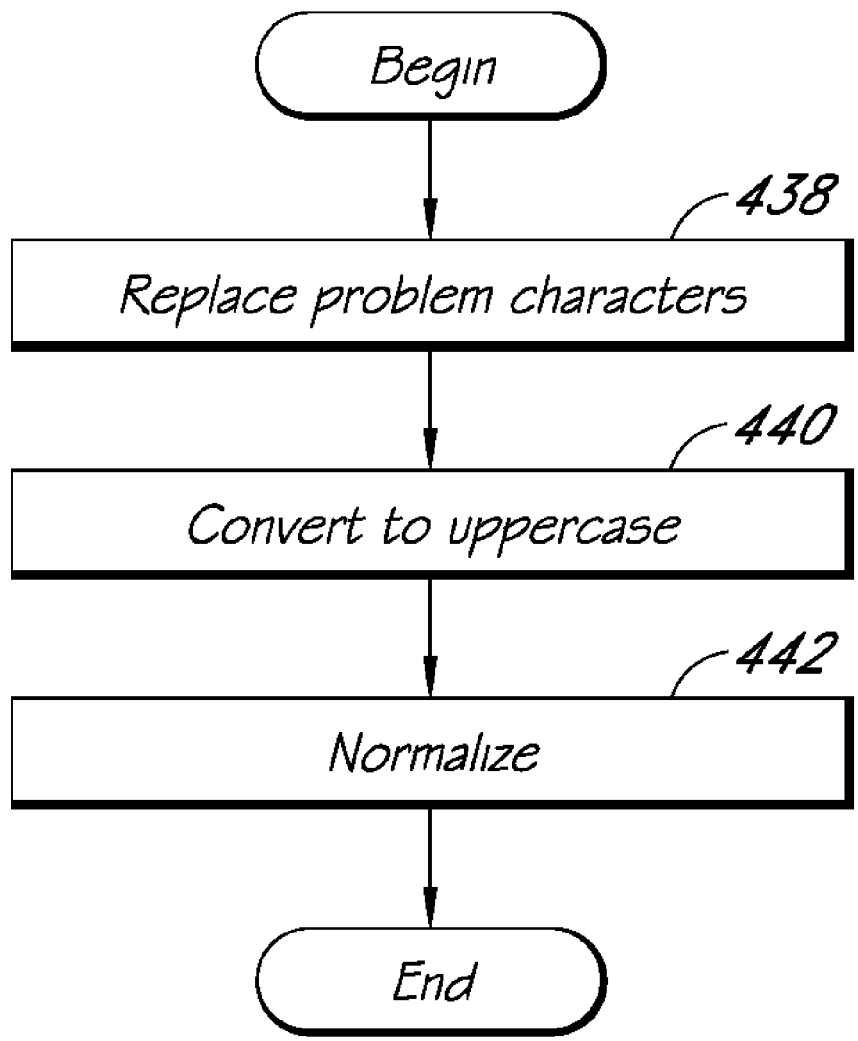

FIG. 4C illustrates a flowchart of one embodiment of regularizing a converted filename. In state 438, the multiple encoding module 160 replaces problem characters. In some cases, translation between encodings is not perfect. For example, when converting a Unicode name to EUC-JP, the Unicode letters representing "\" and "¥" are converted to a single value in EUC-JP. Thus, when a filename including one of these characters is converted to EUC-JP and then converted back to Unicode, it is impossible to determine which character was used in the original Unicode string. This is called a round-trip problem and may be problematic when a user issues a read directory request to list filenames and then attempts to use the return string to open the filename. In one embodiment, this problem may be eliminated by converting all "\" and "¥" in the converted Unicode string to the "\" character. By doing so, looking up either name will return the correct hashed value. In one embodiment, the characters that cause this sort of roundtrip problem for character sets are regularized by replacing the problem characters with an identified character. In other embodiments, other regularizations may also be implemented that are useful for various lookup operations. A table of some examples of possible replacement characters is included as Appendix A, which is incorporated into this application herein.

In state 440, these lowercase characters are converted to uppercase. Because a file system may have Unicode users (in particular, Windows users) that need to lookup filenames in a case insensitive manner—for example, such that "cat" is the same as "CAT"—lowercase characters are automatically converted to uppercase characters.

In state 442, certain special characters or character strings are normalized. Some character encodings permit a character to be represented by two characters combined together. For example, there is a Unicode character "ä", and this character may also be represented by the characters "a" and "¨" combined. In one embodiment, the multiple encoding module 160 may convert the combinable characters into a single character. Thus, the character string "a" and "¨" may be converted to "ä".

Figure 4D:
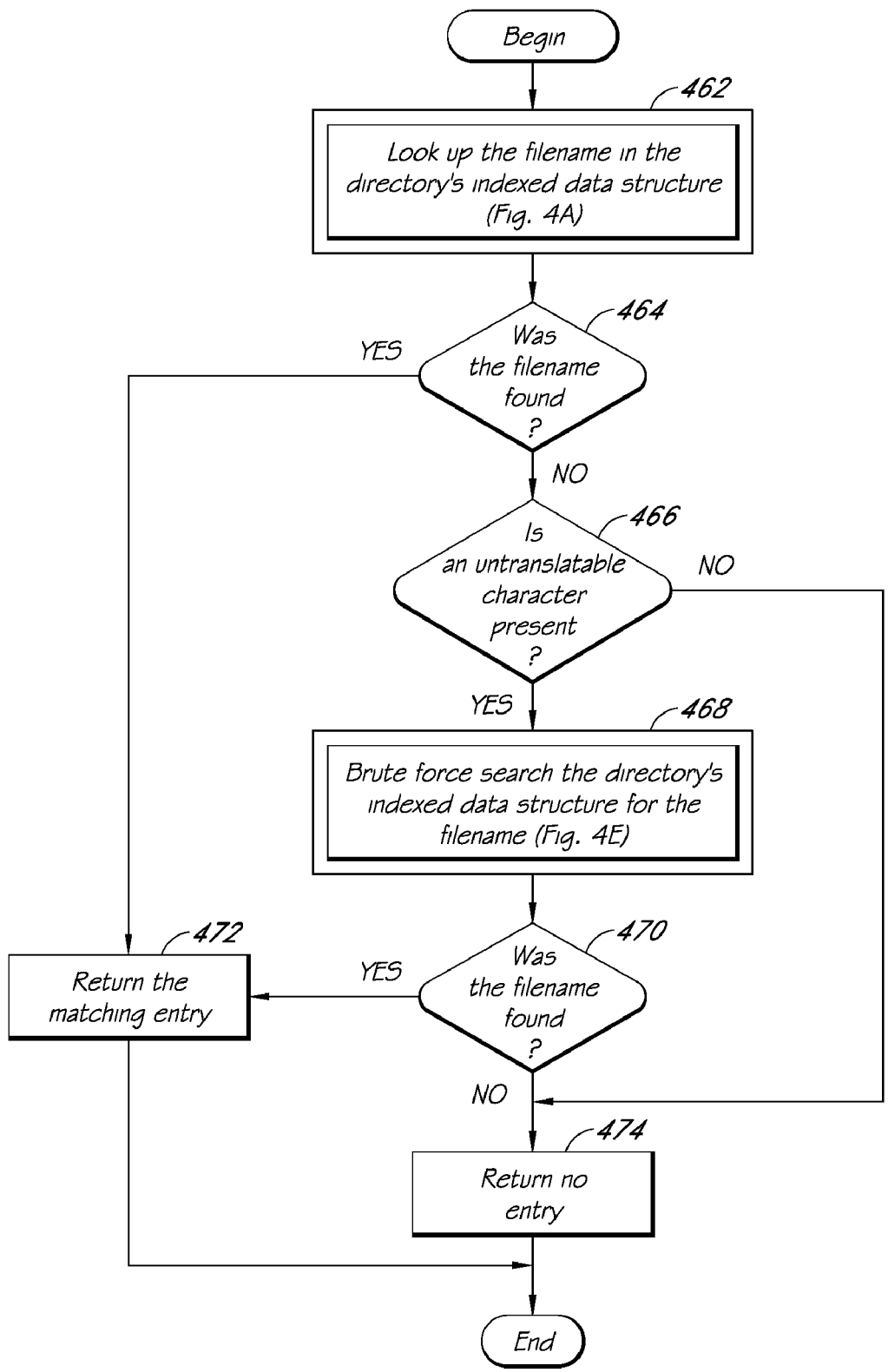

FIG. 4D illustrates a flowchart of one embodiment of looking up a filename that may have characters that are not translatable into the encoding of the requesting process. In the illustrated embodiment, the multiple encoding module 160 attempts first to lookup filenames in the operations described above with reference to FIGS. 4A, 4B, and 4C, even if the filenames have untranslatable characters. In general, when looking up a filename with the same encoding as used to create the name, the filename will be successfully located, even if it includes untranslatable characters. When looking up a filename in a different encoding than the one used to create it, it may be necessary to perform a brute force search to locate the filename with untranslatable characters. In the illustrated embodiment, the brute force search is attempted second, after the normal lookup. In other embodiments, other suitable searches may be used either in place of or in addition to the searching described herein.

In state 462, the multiple encoding module 160 performs the lookup described above with reference to FIGS. 4A, 4B, and 4C. If the filename is found, as determined in state 464, then the multiple encoding module 160 returns the matching entry, in state 472. If the filename is not found, then the multiple encoding module 160 determines whether an untranslatable character is present in the filename, in state 466. If there is no untranslatable character(s), then the multiple encoding module 160 returns no entry, in state 474. If there is an untranslatable character, then the multiple encoding module 160 performs, in state 468, a brute force search for the filename in the directory's indexed data structure. In the illustrated embodiment, the multiple encoding module traverses the leaf nodes 242, comparing the filenames in the respective data elements 262 with the requested filename. This operation is described in more detail below with reference to FIG. 4E. If the filename is found, as determined in state 470, then the multiple encoding module 160 returns the matching entry. Otherwise, the multiple encoding module returns no entry, in state 474.

Figure 4E:
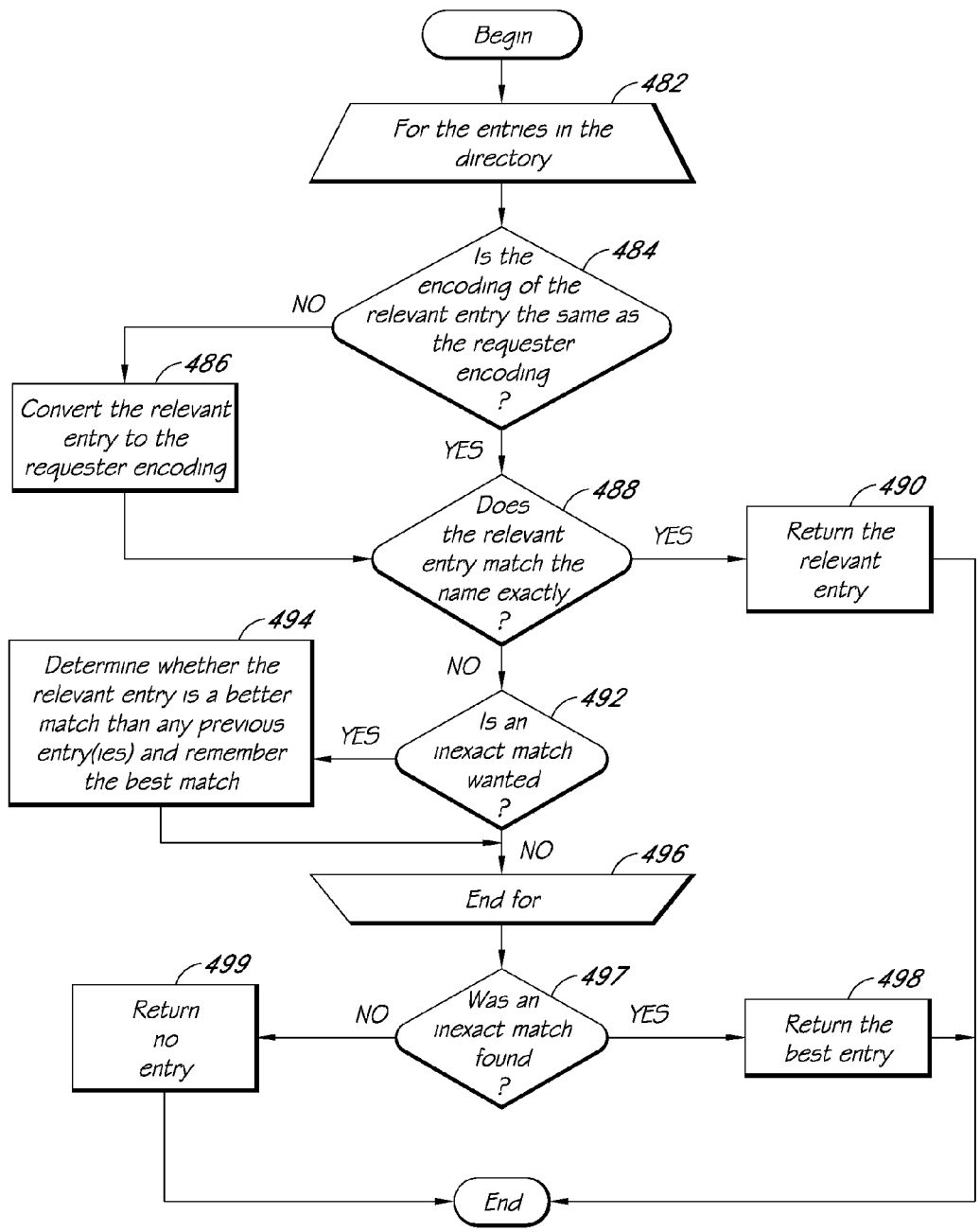

FIG. 4E illustrates a flowchart of one embodiment of performing a brute force search through a directory's indexed data structure. The multiple encoding module 160 performs the operations in the states between state 482 and state 496 for the entries in the directory's indexed data structure. For the operations between the states 482 and 496, the relevant entry is the current entry that the multiple encoding module 160 is performing the operations on. If, as determined in state 484, the encoding of the relevant entry is the same as the requester's encoding, then the multiple encoding module 160 proceeds to state 488. If the encoding of the relevant entry is not the same as the requester encoding, then the multiple encoding module 160, in state 486, converts the relevant entry to the requester's encoding.

If, as determined in state 488, the relevant entry matches the filename exactly, then the multiple encoding module 160 returns the relevant entry in state 490. If the relevant entry does not match the filename exactly, then the multiple encoding module 160 proceeds to state 492. If, as determined in state 492, an inexact match is wanted then the multiple encoding module 160 determines whether the relevant entry is a better match than in a previous entry(ies), and the multiple encoding module 160 remembers the best match, in state 494. If an inexact match is not wanted then the multiple encoding module 160 proceeds to the end of the operations repeated for the entries in the directory. After the entries in the directory have been evaluated, the multiple encoding module 160 determines whether an inexact match was found, in state 497. If an inexact match was found, as determined in state 497, then the multiple encoding module 160 returns the entries of the best match, in state 498. If no inexact match was found the multiple encoding module 160 returns a message indicating that no entry was found, in state 499.

The following exemplary pseudo code further illustrates embodiments of some of the methods described above:

```
/**
 * Make a string suitable for normalizing from a filename/encoding
 */
Regularize(filename, encoding)
    If encoding is not UTF8
        filenameout = filename converted to UTF8
    else
        filenameout = filename
    For each utf-8 multibyte character in filenameout
        If character is in regularization set
            replace character with character it maps to
    Perform Unicode normalization on filenameout
    Convert filenameout to upper case
    If filenameout contains the wildcard character
        return (filenameout, true)
    else
        return (filenameout, false)
--------------------------------------------------
/**
 * Hash a filename/encoding
 */
Hash(filename, encoding)
    (hashstring, wildcard) = Regularize(filename, encoding)
    hash = output of hash algorithm on hashstring
    return (hash, wildcard)
--------------------------------------------------
/**
 * Perform a filesystem lookup
 */
Lookup(dir, filename)
    dowildcard = false
    bestdirent = NULL
    bestmatch = INFINITY
    encoding = encoding setting of process issuing lookup
    (hash, wildcard) = Hash(filename, encoding)
    hashrange = [hash, hash]
    Find the btree root from dir's inode
 back:
    For each dirent in btree with key in range hashrange
        If dirent.encoding != encoding
            compare_name = dirent.fname converted to encoding
        else
            compare_name = dirent.fname
        If compare_name bytewise identical to filename
            return dirent
        else if process wants inexact lookup(case insensitive, etc)
            match = inexact_compare(compare_name, filename)
            If (match < bestmatch)
                bestmatch = match
                bestdirent = dirent
    If bestmatch != INFINITY
        return bestdirent
    If (willdcard and hashrange == [hash, hash])
        hashrange = [0, MAXHASH]
        goto back
    Return ENOENT
```

V. Filenames

Figures 1, 5A:
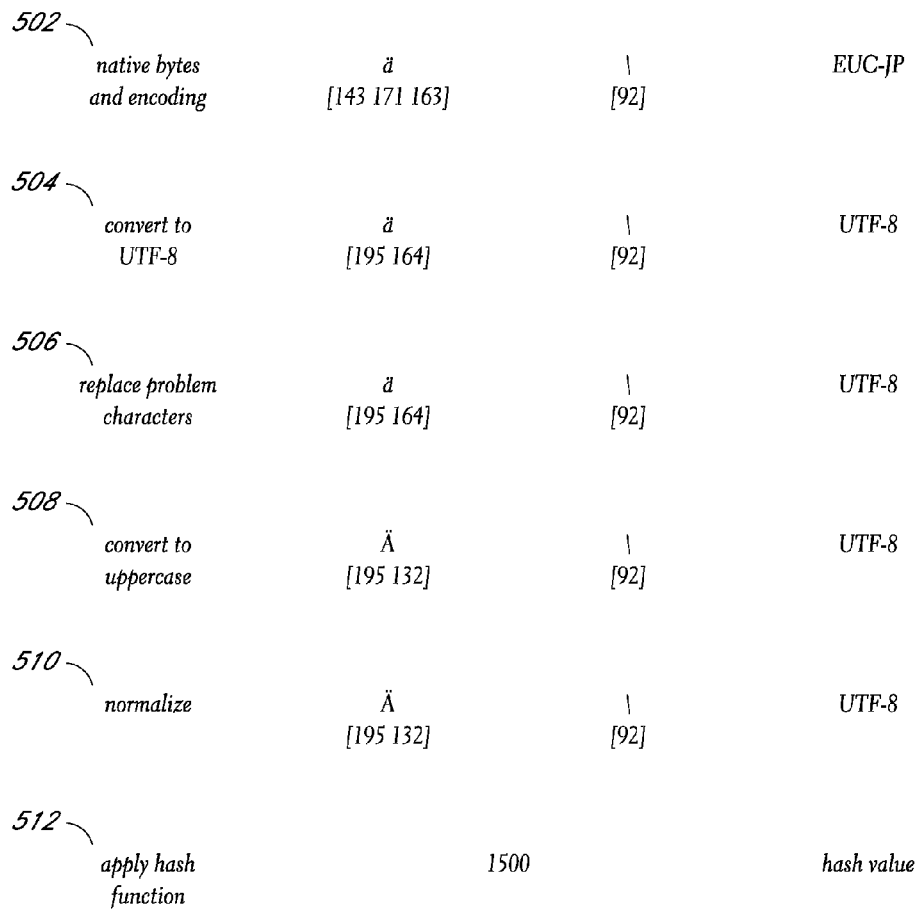

FIGS. 5A-1, 5A-2, 5B, 5C, 5D, 5E, and 5F illustrate embodiments of converting filenames from the original requester's encoding to a hashed value for indexing the filename in its respective directory's B-tree. FIGS. 5A-1 illustrates the conversion operations for the character string "ä\". In the EUC-JP encoding state 502 illustrates the byte values of the character string "ä\", which are [143 171 163] and [92], respectively, in the EUC-JP encoding. In state 504, the native character string is converted to UTF-8. The byte value for "\" UTF-8 is the same as EUC-JP. In UTF-8, the byte values for "ä", however, are [195, 164]. In state 506, problem characters are replaced. In the illustrated embodiment, the problem characters are "\" and "¥", characters which are converted to "\", so the character string remains unchanged. In state 508, the character string is converted to uppercase. Thus, the character "ä" is converted to "Ä", which has the byte value of [195 132] in UTF-8. In state 510, the character string is normalized. In the illustrated embodiment, none of the characters are subject to normalization, leaving the character string unchanged. In state 512, the hash function is applied to the character string "Ä\", yielding a hash value of 1500.

Figures 2, 5A:
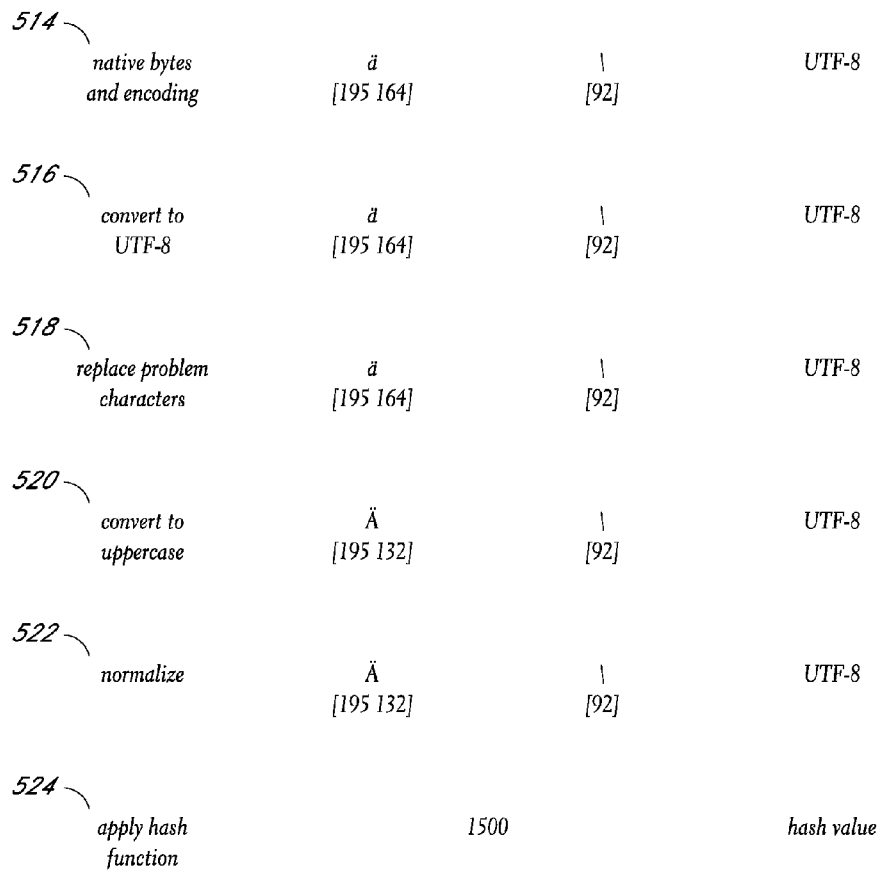

FIGS. 5A-2 illustrates the conversion of character string "ä\" in the UTF-8 character encoding. State 514 illustrates the native byte values of the character string in UTF-8, which are [195 164] and [92], respectively. Because the requester's encoding is the same as the standard encoding, in the illustrated embodiment, the character string remains unchanged in state 516. State 518, 520, 522, and 524 follow the same conversion steps as illustrated in the corresponding states illustrated in FIGS. 5A-1, as described above. Although the original character strings in FIGS. 5A-1 and 5A-2 have different character byte values, the character strings are the same. Because the different byte values represent identical character strings, the file system does not allow the creation of a second file with the identical name. Specifically, the filename of the first creator matches the filename of the second creator when the filename of the first creator is converted to the character encoding of the second creator. Thus, when the multiple encoding module 160 attempts to create the second file with the name "ä\", in the process described above with reference to FIG. 3A, in some embodiments, the second identical filename will not be allowed. In some embodiments, filenames may collide regardless of the order in which the filenames are requested. In other embodiments, filenames may collide depending upon the order in which the filenames are requested.

FIG. 5B illustrates the conversion of the character string "a≅\" in the UTF-8 character encoding to its respective hashed value. State 526 illustrates the native byte values for the character string in UTF-8, which are respectively [97] [204 136] [92]. In state 528, the character string remains the same because it is already in the UTF-8 encoding. In state 530, the character string also remains unchanged because there are no problem characters present. In state 532, the character "a" is converted to "A", which has the byte value [65]. In state 534, the character string is normalized. Because the character "A" and "" may be combined, the character string is converted to "Ä\", which has the byte values of [195 132] and [92], respectively. In state 536, the hash function is applied to the character string "Ä\", which yields the value 1500. Because there is already a filename that hashes to the value 1500, the filename "a≅\" is indexed as 1500,1 as illustrated in FIG. 2C.

FIG. 5C illustrates the conversion of the character string "ä¥" in the Latin-1 character encoding to a hashed value. State 538 illustrates the native byte values of the character string in Latin-1, which are [228] and [165], respectively. In state 540, the character string is converted to UTF-8, resulting in the byte values of [195 164] and [194 165], respectively. In state 542, problem characters are replaced. Because the "\" character and the "¥" are represented by the same byte values in some encodings, these characters are converted to a single character in UTF-8. Thus, the "¥" character is converted to the "\", resulting in a character string of "ä\". In state 544, the character "ä" is converted to the "Ä" character. In state 546, the character string remains the same because there are no characters to normalize. In state 548, the character string "Ä\" is hashed to the value 1500, similar to the examples illustrated in FIGS. 5A-1 and 5B. Because the file system already has two filenames that hashed to the value 1500, the index value for the character string "ä¥" is 1500,2.

FIG. 5D illustrates the conversion of "A≅\" in UTF-8 to a hashed value. State 550 illustrates the original byte values of the character string, which are [65] [204 136] and [92], respectively. In state 552, the character string remains the same because it is already in UTF-8. In state 554, the character string remains the same because there are no problem characters to replace. In state 556, the character string remains the same because there are no lower case characters to convert to upper case. In state 558, the combinable characters are normalized. Because "A" and "" may be combined, the character string is converted to "Ä\", which results in the byte values of [195 132] [92]. In state 560, the character string "Ä\" is converted to the hashed value of 1500. Because the file system already has three filenames that hashed to 1500, the resulting index value for the character string "A≅\" is 1500,3.

FIG. 5E illustrates the conversion of the character string "EL" in the UTF-8 character encoding to a hash value. State 562 illustrates the original byte values of the character string, which are [69] and [76], respectively. In state 564, the character string remains the same because the requester's encoding was already in UTF-8. In state 566, the string remains the same because there are no replacement characters. In state 568, the character string remains the same because there are no lower case characters to convert to upper case. In state 570, the character string remains the same because there are no characters to normalize. In state 572, the character string "EL" is hashed to the value 1500. Although the previous character string that hashed to 1500, as illustrated in FIGS. 5A-1, 5E, 5C and 5D, comprise a character string "Ä\", it is possible for other character strings to hash to the same value. Thus, the example illustrated in FIG. 5E illustrates that two different character strings may hash to the same value. Because the file system already includes four filenames that hashed to the value 1500, the index for the character string "EL" is 1500,4.

FIG. 5F illustrates one embodiment of converting the filename "a[invalid]\" in EUC-JP to a hashed value. State 574 illustrates the original byte values of the character string, which are [97], [150], and [92]. Although the byte value [150] is an invalid character in the EUC-JP encoding, the file system simply accepts the byte value. In FIG. 5F, the invalid character is illustrated with a string "[Invalid]." In state 576, the character string is converted to UTF-8. Because the characters "a" and "\" have the same byte values in UTF-8 and EUC-JP, there is no change to these characters. Furthermore, the byte value [150] is also invalid in UTF-8, and it remains unchanged. In state 578, the character string remains the same because there are no problem characters to be replaced. In state 580, the character "a" is converted to "A". In state 582, the character string remains the same because there are no characters normalized. In state 584, the character string is hashed to the value 1500. As mentioned above, it is possible for different character strings to hash to the same value. Because the file system already includes five filenames that hashed the value 1500, the index or "key" value for the character string "a[invalid]\" represented by the byte values [65] [150] [92] is 1500,5.

VI. Other Embodiments

Although the above-mentioned embodiments describe particular data structures and elements, it is recognized that a variety of data structures with various fields and data sets may be used. In addition, other embodiments of the flow charts may be used.

Furthermore, although the illustrated embodiments have described wildcard handling for untranslatable characters, and other special handling for round-trip problems (for example, yen and backslash), there are other special cases that are easily solved by the embodiments described herein, or trivial variations. For example, a translated name may become too long because of a system limit (such as 255 bytes per name). These and other anomalous edge cases that can be handled by the disclosed embodiments or simple adaptations thereof.

As discussed above, the features of embodiments disclosed herein may be combined with other systems, modules, and so forth. For example, the modules described herein may be combined, in some embodiments, with a module that provides a parallel set of file system interfaces that allow processes written for these interfaces to get the exact byte-string/encoding pairs from the file system. This kind of module may be desirable for backup to tape or for a remote file system. Furthermore, in the embodiments described above, the encoding tags are normally not visible to file system users and are generally inferred based on configurable settings for the particular access mechanism or client process. In other embodiments, the encoding may be provided directly (or indirectly) by the file system users. In some embodiments, respective encodings may be provided on a per filename basis. In other embodiments, the respective encodings may be specified for a particular set of file system operations. It will be appreciated by one skilled in the art that there are many suitable ways to receive or to discern respective character encodings of file system users.

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A system for filename lookup that supports multiple character encodings, comprising:
   a computer-readable data store that stores an indexed data structure comprising a plurality of data elements, wherein a data element is associated with a first key based on a standard character encoding, wherein the data element comprises an encoding tag identifying a first character encoding, the byte values of a name in the first character encoding, and address data for locating file data associated with the name; and
   a computing device in communication with the data store and that is operative to:
      receive a request to retrieve the data element, the request comprising the name in a second character encoding;
      convert the name in the second character encoding into a second key, the second key based on the standard character encoding; and
      retrieve at least the address data of the data element from the indexed data structure using the second key.

2. The system of claim 1, wherein said name is a filename.

3. The system of claim 1, wherein said name is a directory name.

4. The system of claim 1, wherein the indexed data structure corresponds to a directory structure in a file system, wherein the plurality of data elements correspond to files and directories in the directory structure.

5. The system of claim 1, wherein the byte values of the name comprise byte sequences that do not represent valid characters in the standard character encoding.

6. The system of claim 1, wherein the indexed data structure comprises at least one of the following: b-tree, binary tree, tree, b+tree, sorted tree, Patricia tries, red-black trees, and flat-file directories.

7. The system of claim 1, wherein said conversion comprises electronically converting the name in said first character encoding or said second character encoding into a converted name in said standard character encoding and applying a hash function to the converted name to produce said first key or said second key, said first key and said second key both comprising the same hash value.

8. The system of claim 7, wherein said conversion further comprises regularizing the name before applying the hash function, the regularizing comprising one or more of the following: removing one or more problem characters, replacing one or more problem characters with one or more default characters, converting characters to a shared case, and normalizing.

9. The system of claim 1, wherein the computing device is further operative to:
   determine said first character encoding based on a first process and determine said second character encoding based on a second process.

10. A computer-implemented method for filename lookup that supports at least a first character encoding and a second character encoding, the method comprising:
   receiving, at a computer system, a request to retrieve a data element from a data store that stores an indexed data structure, wherein the request to retrieve the data element comprises a name in the second character encoding, wherein the indexed data structure comprises a plurality of data elements, wherein the data element is associated in the indexed data structure with a first key based on a standard character encoding, wherein the data element as stored in the indexed data structure comprises an encoding tag identifying the first character encoding, the byte values of the name in the first character encoding, and address data for locating file data associated with the name;
   converting, by the computer system, the name in the second character encoding into a second key, the second key based on the standard character encoding; and
   retrieving, by the computer system, at least the address data of the data element from the indexed data structure using the second key.

11. The computer-implemented method of claim 10, wherein the indexed data structure corresponds to a directory structure in a file system, wherein the plurality of data elements correspond to files and directories in the directory structure.

12. The computer-implemented method of claim 10, wherein the byte values of the name comprise byte sequences that do not represent valid characters in the standard character encoding.

13. The computer-implemented method of claim 10, wherein said conversion comprises electronically converting the name in said first character encoding or said second character encoding into a converted name in said standard character encoding and applying a hash function to the converted name to produce said first key or said second key, said first key and said second key both comprising the same hash value.

14. The computer-implemented method of claim 13, wherein said conversion further comprises regularizing the name before applying the hash function, the regularizing comprising one or more of the following: removing one or more problem characters, replacing one or more problem characters with one or more default characters, converting characters to a shared case, and normalizing.

15. The computer-implemented method of claim 10, further comprising:
  determining said first character encoding based on a first process and determining said second character encoding based on a second process.

16. A computer-readable storage medium having instructions stored thereon for implementing, when the instructions are executed, filename lookup that supports at least a first character encoding and a second character encoding, the instructions comprising:
  receiving a request to retrieve a data element from a data store that stores an indexed data structure, wherein the request to retrieve the data element comprises a name in the second character encoding, wherein the indexed data structure comprises a plurality of data elements, wherein the data element is associated in the indexed data structure with a first key based on a standard character encoding, wherein the data element as stored in the indexed data structure comprises an encoding tag identifying the first character encoding, the byte values of the name in the first character encoding, and address data for locating file data associated with the name;
  converting the name in the second character encoding into a second key, the second key based on the standard character encoding; and
  retrieving at least the address data of the data element from the indexed data structure using the second key.

17. The computer-readable storage medium of claim 16, wherein said conversion comprises electronically converting the name in said first character encoding or said second character encoding into a converted name in said standard character encoding and applying a hash function to the converted name to produce said first key or said second key, said first key and said second key both comprising the same hash value.

18. The computer-readable storage medium of claim 16, wherein the indexed data structure corresponds to a directory structure in a file system, wherein the plurality of data elements correspond to files and directories in the directory structure.

\* \* \* \* \*